INVENTOR.
Lucas Bruglemans
BY
ATTY.

United States Patent Office 3,308,244
Patented Mar. 7, 1967

3,308,244
CROSSPOINT SWITCHING ARRAY HAVING MARKER PULSE MEASURING MEANS
Lucas Bruglemans, Antwerp, Belgium, assignor to Automatic Electric Laboratories, Inc., Northlake, Ill., a corporation of Delaware
Filed Mar. 18, 1964, Ser. No. 352,910
6 Claims. (Cl. 179—18)

ABSTRACT OF THE DISCLOSURE

Line identification, pathfinding, and operation of the crosspoint relays all take place over the same network operate conductor, which extends through the operate winding in series with a diode at each crosspoint, and in series via interstage links through a plurality of tandem stages. A second winding on each crosspoint relay, connected via another network conductor, holds the connection. Each link has a busy relay with a winding in the hold conductor and a normally closed contact set in the operate conductor. Certain of the link busy relays have differential windings to restore them during line identification. To prevent the pathfinder from responding to short noise pulses, the scanner includes a timing arrangement.

---

This invention relates to a crosspoint switching array and a control arrangement therefor, and more particularly to a switching network using relays as the crosspoint switching devices, and an arrangement for testing the availability of the crosspoints and establishing a connection.

The object of the invention is to provide a fast, efficient arrangement for testing a crosspoint switching network to find an available path and to establish the connection.

A U.S. patent application for Crosspoint Switching Array and Control Arrangement Therefor by K. K. Spellnes, Serial No. 331,282, filed December 17, 1963, now Patent No. 3,288,939, discloses therein a multistage crosspoint switching network, of the type in which there is a plurality of possible paths through the network between any two given terminals at opposite ends of the network, with each stage comprising a plurality of crosspoint matrices, each matrix comprising a plurality of relays arranged in a coordinate array. Each relay has two windings, for operate and hold, respectively, with a diode individual to each relay connected in series with the operate winding between the operate conductors of the horizontal and vertical links. A marker arrangement is provided to test between the operate conductors of the horizontal and vertical links via the relay operate winding and its series diode of one stage at a time. An arrangement is provided to block the test path if the crosspoint being tested is busy, which may for example comprise a busy relay individual to each link having a winding connected to the hold conductor of the link and a normally closed contact set connecting the operate conductor of the link to the marker arrangement, so that for a busy link this busy relay is operated and opens its contacts to thereby open the test path. The marker arrangement includes scanners to test rapidly over several links. The test path provides high resistance such that there is not sufficient current through the operate windings of the crosspoint relays being tested to operate them. Upon selection of a path a low resistance connection is made to the operate conductors to cause sufficient current to flow through the operate winding of the selected crosspoint relay to operate it and thereby establish a connection. A hold path at the crosspoint is completed through its hold winding and a contact set in series therewith to the hold conductor path which is completed via the link. The busy relay associated with each link also operates from the hold conductor path to open the contacts in the operate conductors of the link to thereby prevent selection of the crosspoint for another connection.

A U.S. patent application for a Communication Switching System by M. H. Esperseth, F. B. Sikorski, K. K. Spellnes and W. R. Wedmore, Serial No. 240,497, filed November 28, 1962, now Patent No. 3,275,752, covers a crosspoint switching network comprising switching stages in tandem, with each stage comprising a plurality of crosspoint matrices, with a relay at each crosspoint of each stage, and with the operate or pull windings of successive stages connected in series. Each relay has a diode connected in series with its pull winding to prevent sneak paths involving more than one relay per stage. Operate potentials are applied to a selected pair of terminals, one at each end of a given plurality of stages of the network, to operate the relays in a series path through the pull windings of one relay in each stage to establish a connection. In the embodiment disclosed therein the operate path includes up to three stages in series. The stages are arranged so that between any two terminals on opposite sides of the given plurality of stages through which the operate path extends there is a unique path. Each crosspoint relay also has a second winding in series with a normally open set of its own contacts, and the stages are also serially connected so that after the relays in the selected path have been operated a hold connection extends in series through the second winding and series contacts of the relays in the path. Cutoff or hold relays in the terminating units may also be connected in series in the hold path.

According to the application Serial No. 352,527 filed March 17, 1964 by E. Cotioneo et al., a switching network of the type having relay crosspoints with operate and hold windings connected in series through tandem stages as disclosed in Patent No. 3,275,752 is provided with a path testing arrangement which takes advantage of the unique path through the series connected stages to test over the operate windings through the tandem stages for an idle path and to establish the connection when a path is found. The connection is then held via the hold windings in series. Each interstage link includes a busy relay having its winding connected in series in the hold winding, and has a normally closed contact set connected in series in the operate winding. Thus each link which is busy has its busy relay operated to open the operate path. Therefore when a path including a busy link is scanned the open contacts in the operate path will block the test path so that the path will not be selected. The terminating unit between the scanner and the adjacent stage of the network also includes a busy relay which operates to open the operate path between the scanner and the network and thereby prevent selection thereof.

There is a possibility of difficulty arising from noise pulses induced in the operate windings by switching of adjacent relays. These noise pulses may cause potentials on the scanning leads which could be confused with the signals indicating an idle path to a desired terminal. However these noise pulses are of relatively short duration, and the marking signals to the network remain until a path is found. A feature of the invention relates to a timing arrangement which is actuated when the scanner finds a marking signal to prevent establishment of the connection until a given interval has elapsed which effectively prevents the scanner from responding to the noise pulses.

The above-mentioned and other objects and features of this invention and the manner of attaining them will become more apparent, and the invention itself will be best understood, by reference to the following description of embodiments of the invention taken in conjunction with the accompanying drawings comprising FIGS. 1 to 19 wherein:

FIGS. 1 and 2 comprise a symbolic block diagram of a route selector arrangement according to the invention;

FIG. 3 is a single line block diagram of a communication switching exchange in which the route selector may be incorporated;

FIGS. 4 and 5 comprise a block diagram of the line group and marker of the exchange shown in FIG. 3;

FIGS. 6–9 comprise a block diagram showing the arrangement of the matrices in the switching network of the line group;

FIGS. 10–15 comprise a symbolic block diagram of a portion of the line group and line group marker;

FIG. 16 shows how

FIG. 17 shows how

FIG. 18 shows how

FIG. 19 shows how

LOGIC SYMBOLISM

Figure 1:
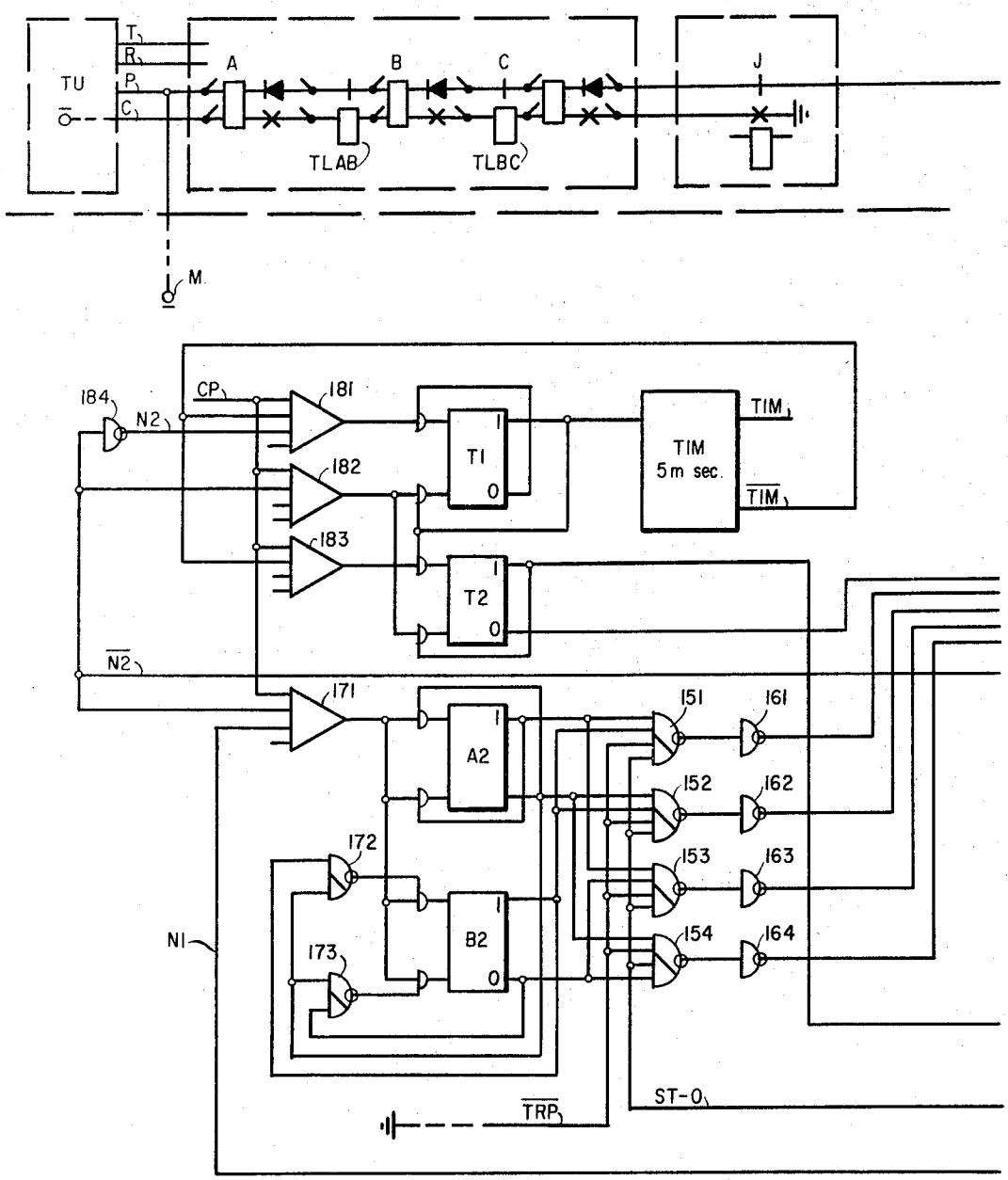
FIGS. 1 and 2 are to be arranged.

Electronic logic circuits used in the system described herein employ as standard building blocks NOR gates, inverters, flip-flops, and gated pulse amplifiers among others.

Each of the flip-flops includes two transistors in a bistable circuit configuration. Each flip-flop is provided with four coincidence gates for inputs, either one of the first two being used to set the flip-flop, and either one of the other two being used to reset the flip-flop. Each coincidence gate has an A.C. input and a D.C. input and requires coincidence of these two inputs to effect a change of state of the flip-flop. Some unused coincidence gates have been omitted in the drawings. The A.C. inputs are usually supplied with a train of recurring pulses from a clock source via a gated pulse amplifier. Each input coincidence gate of a flip-flop is arranged with a priming time so that the D.C. input must be present for this period of time before the A.C. input will be effective. This priming time along with the switching and transmission delays in the circuits provides an arrangement in which a change of state of a flip-flop produced by one A.C. input pulse is not effective at the D.C. inputs of the same or other flip-flops to produce another change of state until receipt of the next clock pulse.

Gated pulse amplifiers are transistor circuits having a direct coupled gating input arrangement and a capacitively coupled trigger pulse input terminal. When the two inputs coincide an output pulse is produced. The direct coupled gating is controlled via three input terminals and is effective when the first two of these inputs are true in coincidence, or the other input is true. Thus each gated pulse amplifier has four inputs and are always shown such that the upper input is the pulse input, the next two inputs are direct coupled coincidence inputs, and the last is a single direct coupled input. The direct coupled inputs are so arranged that if one of the coincidence control inputs is not used the other is effective when true and not effective when false, and if the single direct coupled input is not used it is not effective.

The logical gates are implemented with NOR gates, each of which is a one transistor logical element whose output can either be considered an AND function of the negation of its inputs, or it can be considered as an OR function of its inputs followed by an inversion. Therefore, the AND gates and the OR gate shown throughout the system are implemented with NOR gates. The electronic units are shown in the drawings as having any number of inputs and output loads, but in actual implementation these would be limited by loading requirements well known in the art.

A relay driver is a circuit represented by a triangle having a line across it parallel to the base, with a single input to the base, and a contact adjacent to the apex. Each relay driver comprises a single transistor with the input connection to its base electrode, and a winding in the collector circuit which operates the single contact.

Except for the clock pulses used for triggering at the A.C. inputs of the flip-flops and gated pulse amplifiers, the logic circuits in the system are direct coupled, that is, signals are represented by steady-state voltages. Two levels are employed. The first level is usually −8 volts, although other negative values may be used, and represent the binary 1, true, on or active condition. The second level, ground potential, represents the binary 0, false, off or inactive condition. The flip-flops are used as registers with double-rail output signals to drive the logic circuits. A double-rail output is one which both the logical "1" and "0" conditions are represented by active signals on separate leads. Only one of the two leads, however, has an active signal at any time. In the actual implementation most of the flip-flops and gate circuits are arranged such that the negative bias potential is provided at the input terminals of the gates and the D.C. inputs of the flip-flops, and this serves as the bias potential for the outputs of the preceding circuits. For the false condition, the flip-flops and gates provide a low resistance path to ground via a saturated transistor, and this ground potential is thereby applied at the inputs of the succeeding circuits.

In describing the logical operations performed by the circuits, Boolean algebra equations are used. In this notation the addition symbol signifies OR, the multiplication symbol, expressed or implied, signifies AND, and overlining signifies the inverted condition.

ROUTE SELECTOR (FIGS. 1 AND 2)

Figure 2:
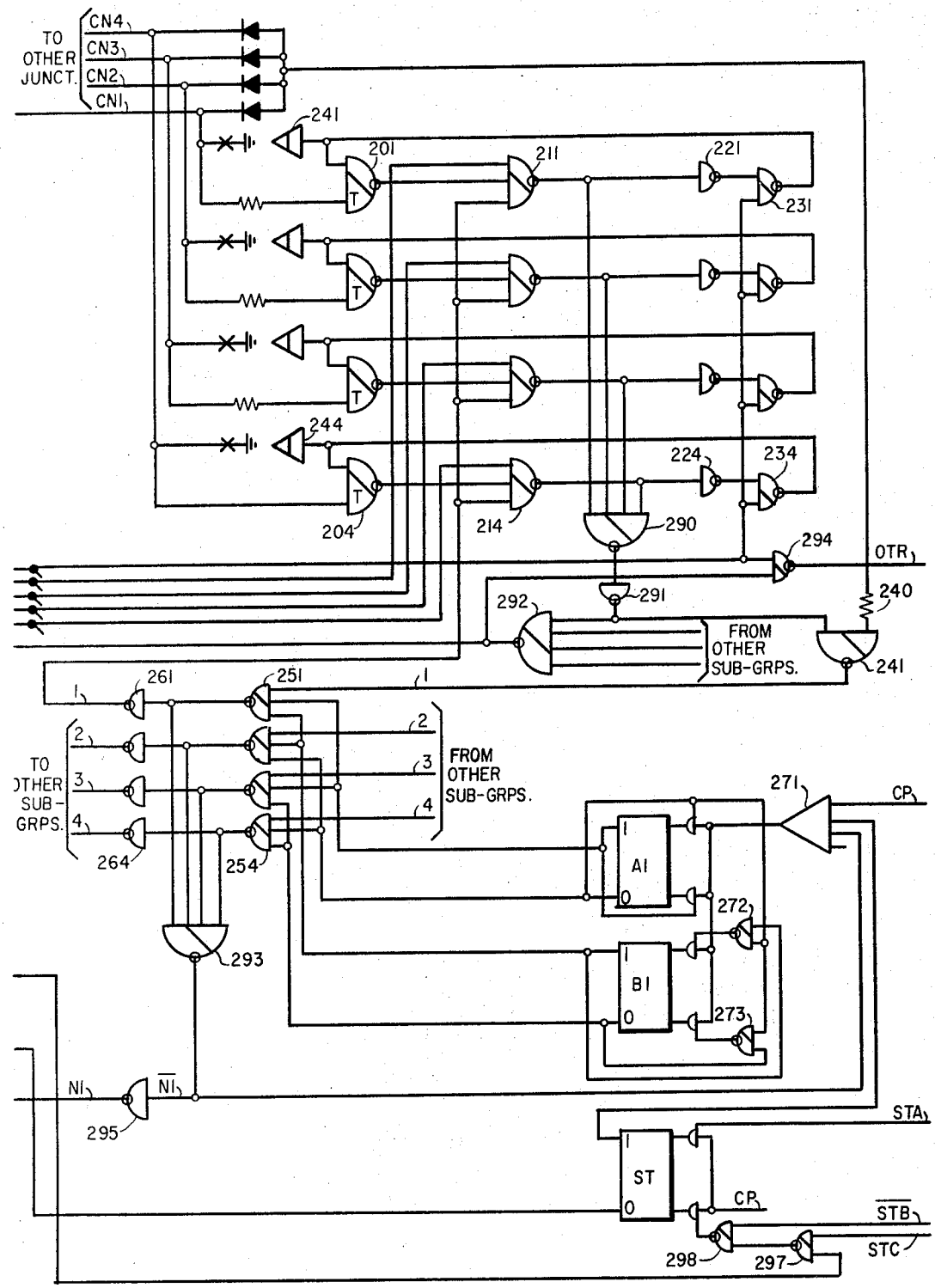

A route selector along with a portion of a switching network embodying the invention is shown in FIGS. 1 and 2. The operate conductor P and hold conductor C of one path through the network is shown in FIG. 1 extending from a terminating unit TU through one crosspoint in each of the stages A, B and C of the switching network, thence through a junctor J. Each crosspoint comprises a two winding relay, being the operate and hold windings respectively. Each crosspoint includes a diode in series with its operate winding and a normally open set of contacts in series with its hold winding. Each interstage link includes a busy relay, such as relay TLAB in the AB link and relay TLBC in the BC link of FIG. 1, each having its winding in series in the hold winding and a normally closed set of contacts in series in the operate winding. The junctor J also includes a relay which operates when the junctor is busy, with a set of make contacts to apply ground potential to the hold conductor and a set of break contacts in series between the switching network and a conductor CN1 to the route selector. The terminating unit TU when in use applies battery potential to the hold conductor C. When the terminating unit TU is selected for a connection, a negative marking potential from a terminal M is applied through marking circuits not shown in FIG. 1 to the lead P, and this potential extends through the operate windings and their associated diodes of the network and a plurality of junctors such as J.

Referring now to the route selector, in FIG. 2 there are shown four detecting NOR gates 201–204, each having an input connected via a resistor to a respective one of the leads CN1–CN4 which are connected respectively to the operate conductors to junctors for scanning. The route selector includes additional input leads CN5–CN16 to respective detecting NOR gates not shown in FIG. 2. The outputs of gates 201–204 are connected respectively to NOR gates 211–214 whose outputs are connected through respective inverters 221–224 to NOR gates 231–234, and the outputs of these gates are connected to respective relay drivers 241–244. Each of the relay drivers comprises a transistor amplifier having a relay winding in its collector circuit and a single make contact.

The route selector includes two counters, the first comprising flip-flops A1 and B1 in FIG. 2, and the other comprising flip-flops A2 and B2 in FIG. 1. The outputs from the flip-flops of the first counter are supplied to decoding gates 251–254. Each of these gates also has an input from a detecting NOR gate, for example gate 251 has an input from the output of detecting NOR gate 241. The four route selector input leads CN1–CN4 are connected through respective diodes to a common lead through resistor 240 to an input of the detector NOR gate 241. The output from gate 251 is connected through an inverter 261 to the four gates 211–214, and likewise the outputs of gates 252–254 are connected through inverters 262–264 to other gates corresponding to the gates 211–214 for the other route selector input CN5–CN20. The outputs from gates 251–254 are all also connected as respective inputs to a NOR gate 293 which produces a signal $\overline{N1}$ for controlling the two counters.

A gated pulse amplifier 271 supplies advance pulses from a pulse source via lead CP to the first counter when enabled by coincidence of the signal from the start control flip-flop ST and the signal $\overline{N1}$.

The second counter is advanced by pulses from lead CP via a gated pulse amplifier 171 when enabled by coincidence of signal N1 and $\overline{N2}$. The output from the flip-flops of the second counter are decoded by gates 151 and 154 when enabled by a signal from the flip-flop ST. An additional control lead $\overline{TRP}$ is shown connected to these gates, which may be assumed to be coupled to ground. The outputs from the gates 151–154 are connected through inverter 161–164 to the gates 211–214 respectively, and also to the corresponding gates in the other sub-groups of the route selector. Thus each of the gates 211–214 in the first sub-group and each of the corresponding gates in the other sub-group has one input from a detecting NOR gate, one input from the first counter, and one input from the second counter, so that the sixteen input leads CN1–CN16 are scanned one at a time.

To prevent false seizure of a path by a noise pulse on one of the leads CN1–CN16 which could be produced by noise pulses in one of the matrix relays produced by switching of adjacent relays, the route selector includes a timing arrangement comprising flip-flops T1 and T2 controlled by gated pulse amplifiers 181, 182 and 183, and a monostable multivibrator TIM.

To explain the operation of the route selector, assume that the terminating unit TU is selected for a call, and that a marking potential has been applied from the negative potential at terminal M to conductor P, and thence via the operate path through the crosspoints A, B and C, and junctor J to lead CN1. This potential is extended through a diode and resistor 240 to an input of gate 241 and through a resistor to an input of gate 201, causing the outputs of these two gates to go to ground potential. The test path via the operate conductor of the matrix and the detector arrangement in the route selector has a high resistance, so the current through the crosspoint relay windings is low compared to the current required to operate the crosspoint relays.

A signal applied via lead STA supplies a D.C. enabling signal to the set input of the flip-flop ST which is then set by the pulses appearing on lead CP. The negative potential appearing at the "1" output of flip-flop ST in coincidence with the normally negative potential on lead $\overline{N1}$ enables the gated pulse amplifier 271 so that the train of pulses on lead CP drives the first counter until it reaches a step corresponding to one of the sub-groups of the route selector having a negative potential at one of its input leads. In this case a negative potential via resistor 240 to gate 241 produces a ground potential at the input of gate 251, so that when the counter steps to the position in which both of the other inputs of the gate 251 are at ground potential and a negative potential therefore appears at the output thereof. This potential via NOR gate 293 causes the signal on lead $\overline{N1}$ to go to ground potential thereby disabling the gated pulse amplifier 271 and stopping the first counter. At the same time this signal through gate 295 causes a negative potential to appear on lead N1 which in coincidence with the normally negative potential on lead $\overline{N2}$ enables gate 171 to start the second counter. The output from gate 251 is also applied via inverter 261 as a ground potential at each of the gates 211–214. In the decoding gates of the second counter, each of the gates 151–154 has a ground potential at an input from the "0" output of flip-flop ST via lead ST–0, and it has been assumed that the potential on lead $\overline{TRP}$ is at ground potential. When the counter advances to the step at which the connections from the outputs of the flip-flops A2 and B2 to gate 151 are both at ground potential, a ground potential appears at the output of inverter 161 so that the scanning gate 211 now has all of its inputs at ground potential. This produces a signal which via gates 290, 291 and 292 produces a ground potential on the lead $\overline{N2}$, thereby disabling gated pulse amplifier 171 to stop the second counter.

A check is now made to determine whether the detected negative potential is a noise pulse caused by induction in the matrix relays or whether it is an actual marking signal. Since the signal on lead N2 at the output of inverter 184 is true flip-flop T1 is set and the monostable TIM is triggered. If within 5 milliseconds the negative potential at point CN1 disappears, the signal on lead $\overline{N2}$ becomes negative enabling gated pulse amplifier 182 to supply a clock pulse to reset the flip-flop T1 immediately and no further action of the route selector will occur except that the second counter starts counting again because signal on lead $\overline{N2}$ is true. When the negative potential at lead N2 remains longer than 5 milliseconds, the monostable TIM returns to its normal position causing the signal on lead $\overline{TIM}$ to be negative to enable gated pulse amplifier 183 to supply a clock pulse to set flip-flop T2. The zero output of flip-flop T2, which is connected to inputs of gates 231–234, and corresponding gates in the other subgroups, is now at ground potential. Since the other input of gate 231 is at ground potential from the output of gate 211 via inverter 221, its output becomes negative and supplies an enabling signal to operate the relay driver 241 which connects ground potential to lead CN1. The negative potential at the output of gate 231 is also applied as an input to gate 201 to lock it so that its output remains at ground potential regardless of the ground potential being applied to lead CN1. Also gate 241 is locked by negative potential from NOR gate 290 via inverter 291. This locking of the two detector NOR gates insures that the counters both remain stopped in the selected position. The low resistance ground potential supplied to lead CN1 now extends through the operate windings of the crosspoints A, B, and C to the negative marking potential at terminal M, causing the three crosspoint relays to operate. The relay in junctor J responds to the seizure and operates, applying ground potential to the hold conductor which extends through the hold windings to negative potential in terminating unit TU thereby holding the crosspoint relays in stages A, B, and C, and operating the busy relays TLAB and TLBC.

Signals are now supplied via NOR gates 297 and 298 to cause the clock pulse on lead CP to reset the flip-flop ST. The negative potential on lead ST–0 via gates 151, 161, 211, 221, and 231 produces a ground potential at the input of relay driver 241, causing it to release and thereby remove the ground potential from lead CN1.

COMMUNICATION SWITCHING SYSTEM

Figure 3:
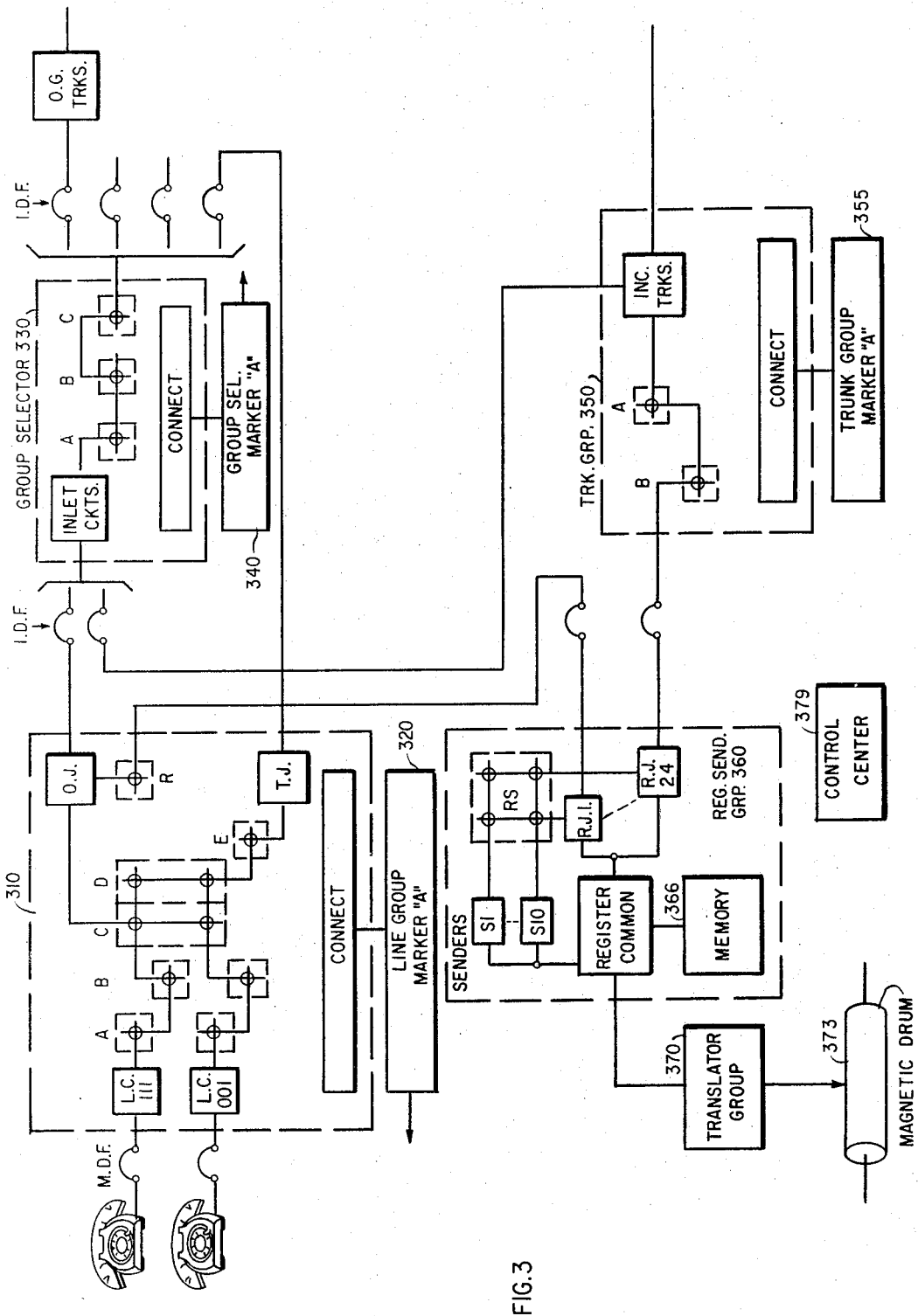

FIG. 3 is a single line block diagram of a telephone switching exchange in which the invention may be embodied. The exchange consists of a line group switching network 310 with its marker 320, a group selector switching network 330 with its marker 340, a register sender group 360, and the translator 370. There is also a trunk group 350 with its marker 355 which provides access from incoming trunks to the registers, and a control center 379 which contains a special computer for operation analysis and recording, and program upgrading equipment.

All of the electronic equipment is furnished in duplicate, for instance, two line group markers 320 may serve up to ten line groups and two group selector markers 340 may serve up to ten group selectors. A minimum of two register-sender groups 360 will be equipped per office and the translator 370, including the magnetic drum 373 and logic circuitry, will always be furnished in pairs per 10,000 directory numbers.

Time division techniques are used in the register sender group 360 and in the translator 370. The markers are designed on an electronic basis and semiconductor circuitry is employed throughout the system. A ferrite core memory 366 is used for temporary storage whereas the magnetic drum 373 is used for semipermanent storage.

The space division switching elements of the system consist of reed relay matrix assemblies. The crosspoints are made up of reed capsules and have normally two windings. They are mounted on a two-layer printed card and the entire assembly constitutes a switching matrix. In some cases the cards are wired together to form a single larger matrix. The system contains no conventional telephone relays, but, similar functions are performed by reed relays. A reed relay assembly is essentially a cluster of magnetic reed elements controlled by coil windings and with or without a permanent magnet. For further description of the reed relay assemblies and crosspoint matrix assemblies reference may be made to U.S. patent application by E. J. Glenner and K. K. Spellnes for "Crosspoint Switching Arrays," Serial No. 127,237, filed July 27, 1961, now Patent No. 3,188,423.

As an introduction to the system operation, a brief description of a typical call as processed through the system is now presented. The block diagram of FIG. 3 may be followed for tracing the call.

The call is initiated by a subscriber lifting his handset, which causes the line group marker 320 to go into action first by detecting the originating call mark, identifying the calling line, and selecting an idle register junctor within the register sender. A path is then temporarily established from the calling telephone to the register junctor via the A, B, C, and R matrices, and the subscriber receives dial tone. The dialed digits are stored temporarily in the register memory 366, coded, and processing is continued as these digits are passed to the translator 370, analyzed for type of incoming call, and instructions are selected from the drum memory 373 and returned to the register-sender 360 to guide further handling of the call. Upon receipt of the remaining digits, the translator 370 returns switching instructions corresponding to the called number as stored in the drum memory 373. The instructions are transmitted from the register-sender 360 via one of the senders S1–S10 and the originating junctor OJ of the originating line group to the group selector 330. In the group selector 330, the instructions are analyzed by the marker 340, an idle terminating junctor TJ in the terminating line group is located, and a path established to that line group via A, B, and C matrices of the group selector. The remaining instructions are followed by the line group marker to locate the called line terminals, select and seize a path from the terminating junctor through the E, D, B and A matrices to the called line. The terminating junctor establishes ringing, answer supervision, and talking battery for both parties when the call is answered.

Since the system is a common control operation, the markers of the line group and group selector function only to serve the assigned portion of the call processing then release to serve other calls. The register-sender 360 and the translator 370 are functioning on a time division basis and therefore are processing several calls simultaneously. The temporary signaling and control paths are released for further sevice while only the talking paths are held through the switching matrices and junctors.

LINE GROUP MATRIX

Figure 4:
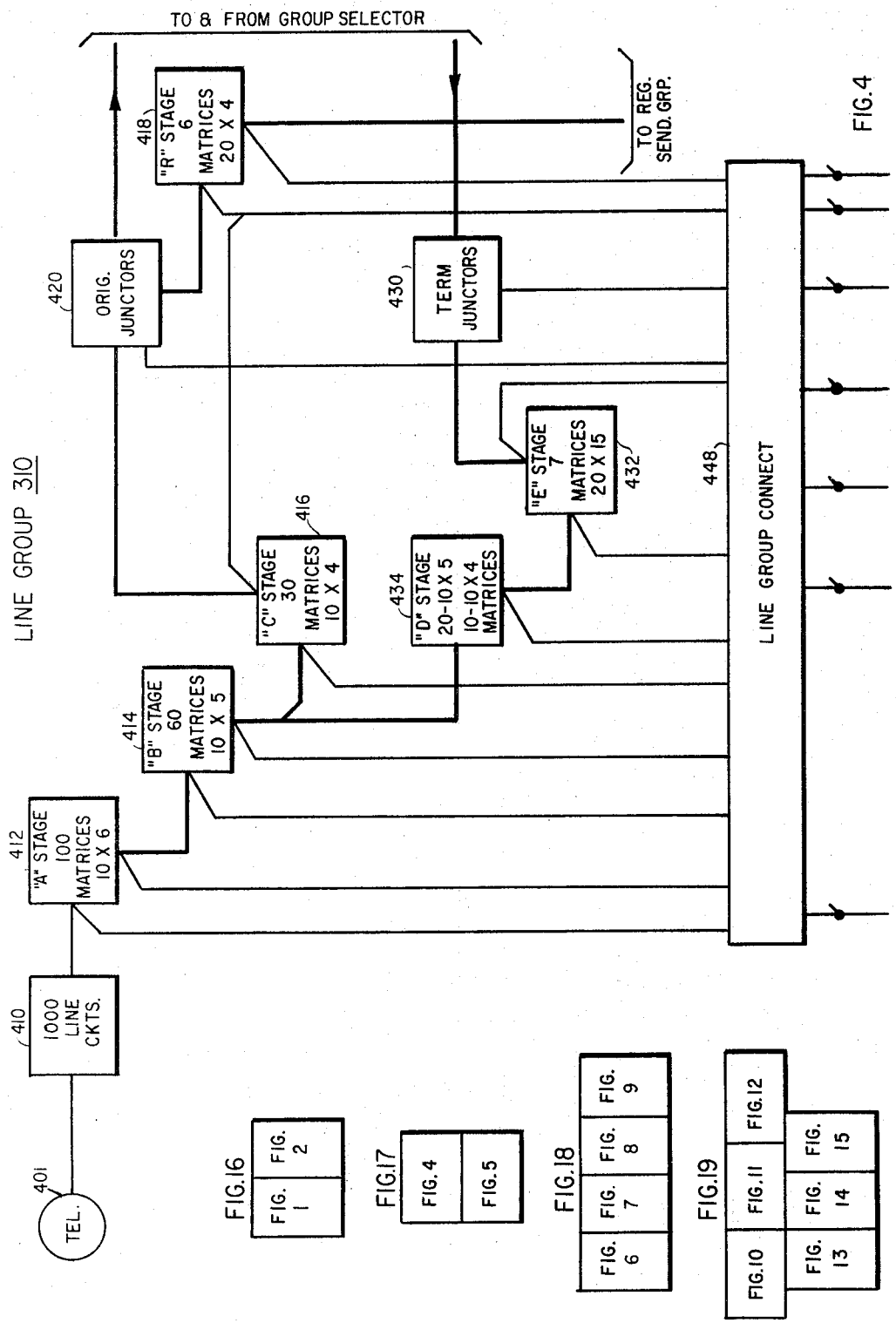
FIGS. 4 and 5 are to be arranged.
Figure 5:
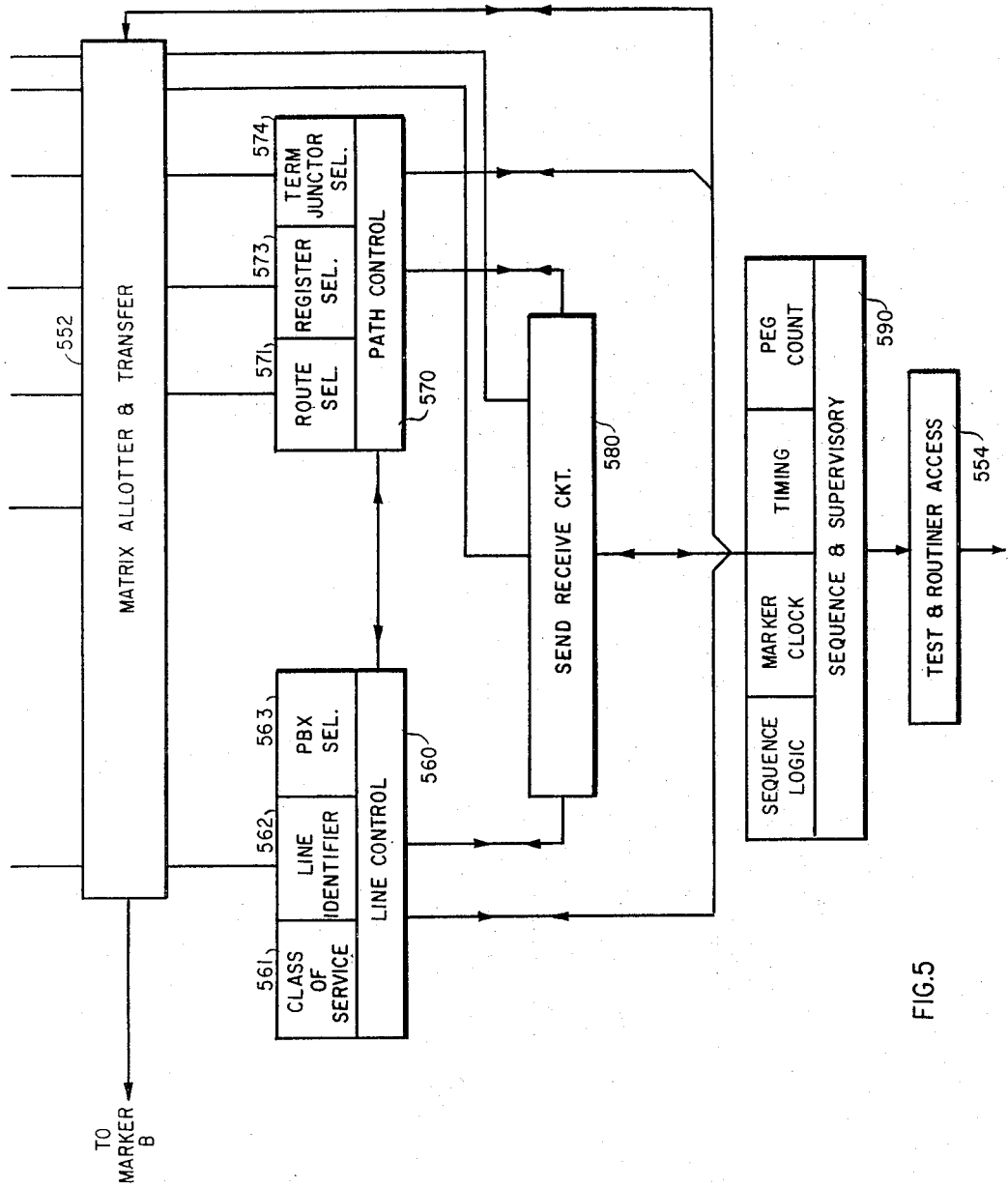
Figure 6:
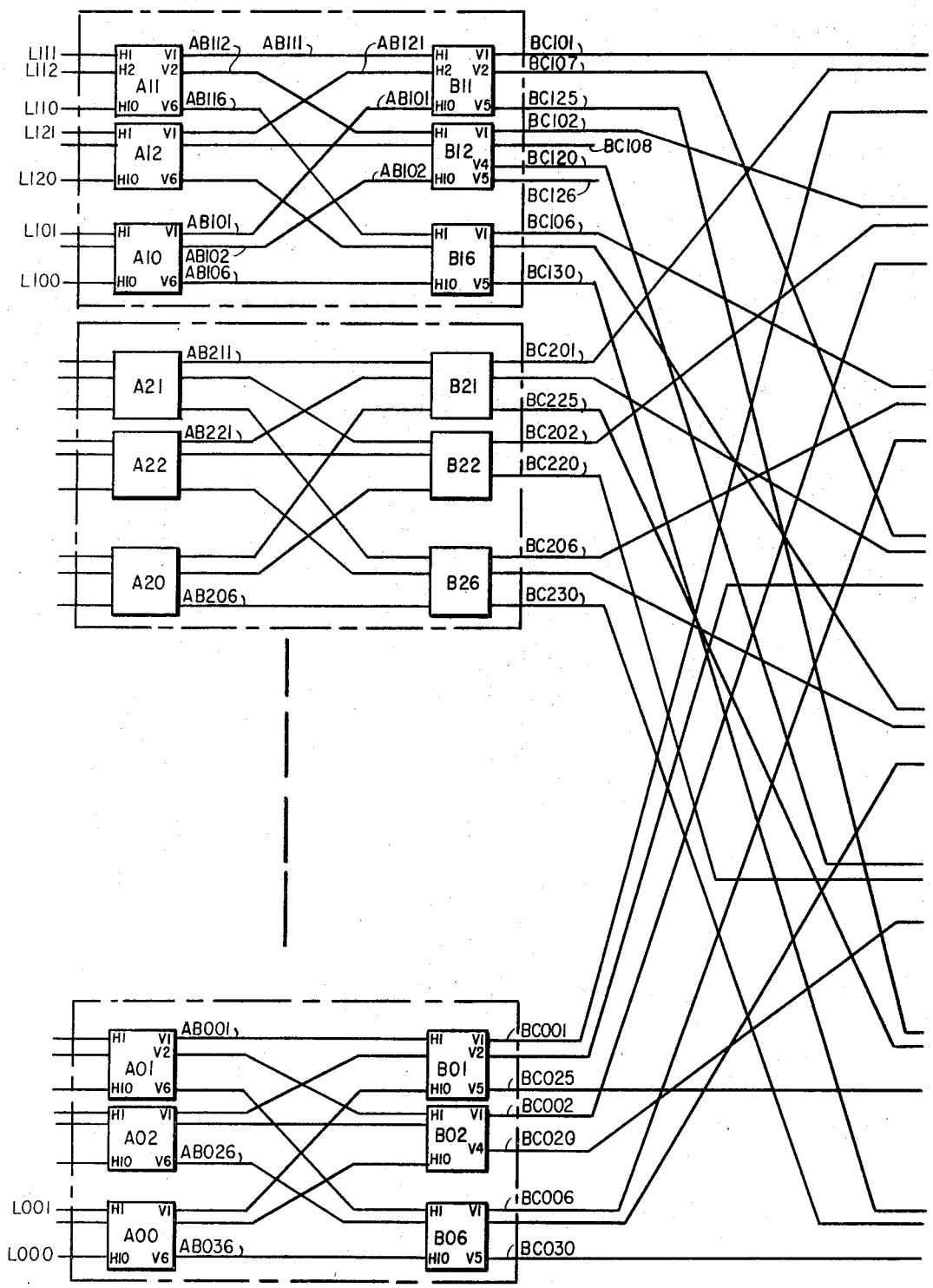
FIGS. 6–9 are to be arranged.
Figure 7:
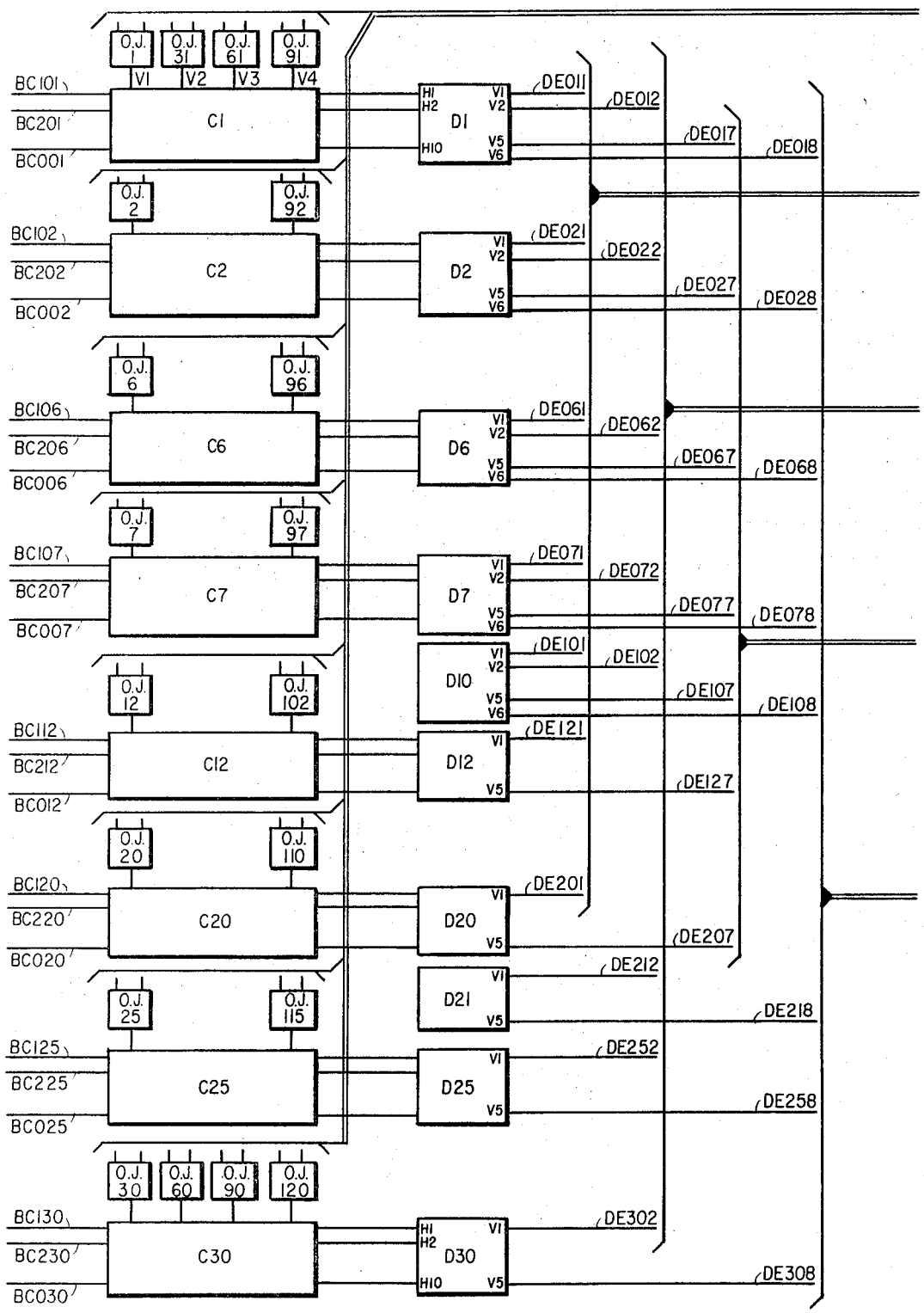
Figure 8:
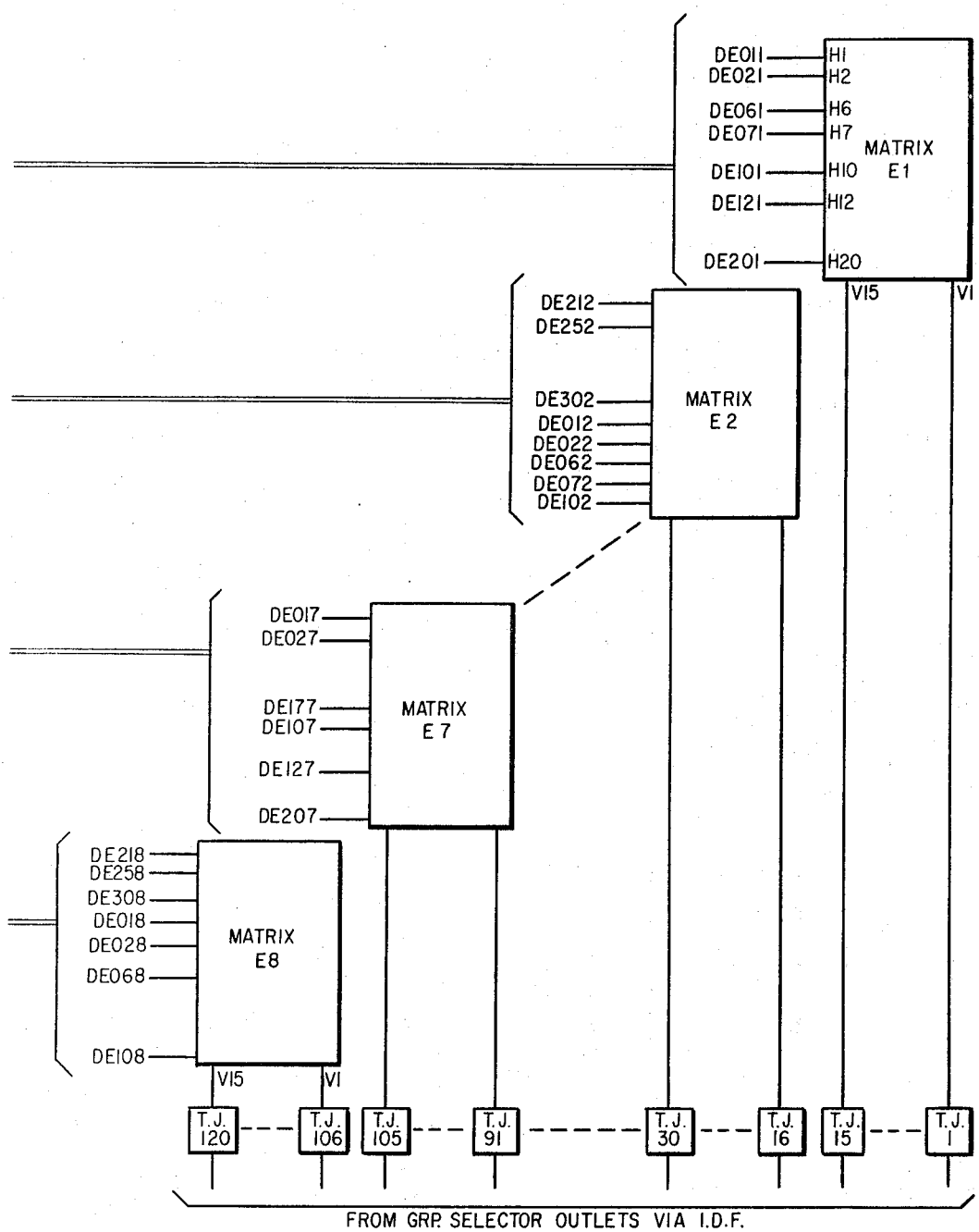

FIG. 4 is a block diagram of a line group 310, and FIG. 5, which should be placed below FIG. 4, is a block diagram of a line group marker 320. The line group 310 may be thought of as a large switching unit capable of connecting any one of 1000 lines originating calls to any one of 120 circuits called originating junctors 420. Likewise, this unit is capable of connecting any one of 120 circuits called terminating junctors 430 and representing incoming calls to any one of the 1000 lines served by this line group. Cross-point matrices constitute the switching network and provide concentration going outward for originating calls, and expansion going inward for terminating calls. For practical and economic reasons, three stages, A, B, and C, make up the outgoing switching stages. Four stages, E, D, B and A, make up the incoming switching stages. The 1000 subscriber lines divided into ten groups of 100 each, are located on the main distributing frame and from there are jumpered directly to the A stage 412. No intermediate distributing frame is required. The A stage has 600 outlets or links (60 for each of the ten "hundreds" group) appearing as inlets to the B stage 414. The B stage, in turn, has 300 links (30 for each "hundreds" group) appearing as inlets to the C stage 416. The C stage has 120 links to origitating junctures 420. The originating junctors provide by-paths via the "R" stage to twenty-four registers and also provide access to the inlet circuits of the group selector 330. With this switching configuration, a fully equipped line group is capable of handling a maximum traffic of three unit calls per line in each direction at a grade of service better than .01.

The switching stage matrices are made up cross-point reed relays, 15,000 for a fully equipped 1000 line group or 15 per line, (12 per line for two unit calls per line). The reed relay coil has two windings, an operate (or pull) winding and a hold winding, and has three contacts. Two of the contacts switch the transmission loop. A third locks the hold winding to the sleeve or "C" lead.

The subscriber's line equipment is similar to a conventional line and cut-off circuit except that reed relays are used and fewer contacts are required. Reed relays were chosen over a static line circuit for simplicity and reliability of operation and for electrical isolation of electronic apparatus from outside plant disturbances.

A maximum of thirty subscribers in a given hundreds group may be engaged in different conversations at one time. One originating and one terminating junctor, two each of A and B crosspoint reed relays, and one each of D, C, and E crosspoint reed relays are held in the line group per conversation. Registers are held only during dialing.

The originating and terminating junctors mentioned earlier are reed relay circuits performing several functions. The originating junctor provides loop splitting facilities for an originating call. Initially, a transmission path is provided from the calling line to register and an additional path is provided from register to group selector for early outpulsing. When the called line is reached, the originating junctor switches the calling line through to the terminating junctor via the group selector. The circuit also provides a busy tone bridge in the event of no link availability.

The terminating junctor performs functions necessary to extend the call to a called subscriber. It provides a path into the line group marker for signaling between the code receiver in the marker and the sender circuit. The circuit provides regular or party line ringing controls, ring back tone, and ring cut-off controls. When line busy is encountered, busy tone is provided at this point. It provides transmission battery feed for both called and calling parties. On test calls and busy verification calls, the junctor removes the battery feeds and switches the calling line metallically through to the called line. For official calls, answer supervision is disabled within the junctor to prevent charging of the calling end. Thus, it is seen that special service calls are also handled by the terminating junctor via the regular switching network eliminating the need for a special switch train.

LINE GROUP MARKER

Two markers 320 (FIG. 5) are always provided and the 1000 line groups are divided between the two up to a maximum of five line groups per marker. Each marker serves its associated line group matrices on an allotted basis, but, is also capable of assuming the load of its companion marker.

In its idle state, a marker continuously scans for requests for service from the line groups with which it is associated. Upon recognizing a call, either originating or terminating, in a particular line group, it locks out all other groups via its allotter and allows the connect circuitry of the selected group to switch in the matrix leads into the marker for processing. Approximately 400 leads are so controlled. All calls in the allotted line group are processed before the marker returns to its idle state to serve other groups.

When connected to a line group, the marker has two primary functions, connect a line originating a call through the matrices and originating junctor to a register and to connect a terminating junctor (representing an incoming call) through the matrices to the called line. Both reed relays and electronic circuitry are used to perform these jobs. The electronic circuitry provides all logic and scanning operations requiring high speed. Reed relays are used merely for connecting purposes, to switch in the necessary groups of leads into the electronic circuitry for analysis. With this combination of components, the processing of a request for service by the line group marker is accomplished in approximately 100 milliseconds.

For each function, the marker performs several tasks. In general, for originating traffic, it must provide line number identification, pathfinding and route selection, sending of line number identification, class of service (225), and line group identity. For terminating traffic, it must provide terminating junctor identification, transceiver for communicating with the sender circuit, access to called line for busy test, PBX selection, and pathfinding and route selection.

The tasks performed by the marker in processing a call are controlled by a sequence and supervisory circuit 590. This control may be compared to a programmed computer in that the marker follows a fixed plan of operation. All marker operations are governed by this control.

Included is the clock circuit which provides pulses to synchronize operations within the marker and the timing circuitry which is used to generate various time-out periods such as that provided between a reed relay operation and a succeeding electronic scanning operation. Once the supervisory control recognizes a request for service, either terminating or originating, it will process this call from beginning to end, locking out all other calls.

OPERATIONAL DESCRIPTION

The line identifier provides a unique identification of one calling line from the group of 1000 lines. In the event of a simultaneous request for service by two or more lines, all lines but one are excluded from the processing. By means of a contact on the line reed relay, the identifier recognizes a request for service and is able to provide a three digit line identification—hundreds, tens and units. Thus, it is possible to uniquely mark one of the one thousand "pull" leads at the inputs to the "A" stage matrices. Reed relays are used for a "tree" configuration to reach the desired "pull" lead after the identity has been made.

Pathfinding consists of establishing an idle route through the A, B, C, and R matrices from the identified calling line to a register. The marker, after the line identity, preselects any idle register located on the outlets of the R matrix. The term "preselect" is used in that the selection is conditional upon whether an idle route exists back to the calling line. Having preselected a register, the marker now has sufficient information to gate all originating junctors that can be reached from these two end points to the route selector. The links and junctors will be marked busy or idle by busy relays therein. It now becomes a simple matter to scan these possibilities for an idle route. If no idle path can be found, another register is preselected which then presents other route possibilities. Having found an idle route, all information for completing the connection is available.

When acknowledgment is received from the register after marker information has been outpulsed, a "pull" potential is applied at the C matrix to pull up in series the A, B, C crosspoints to the potential applied by the identifier at the input to the A matrix. Another "pull" potential is applied to the "R" matrix outlet to pull up the "R" crosspoint. This A to C and R pull connection will be held until the cut-off reed relay operates.

At a signal from the register-sender circuitry the line number and line group identity is electronically pulsed out to the register-sender via the link connecting the "R" matrix and the register. Serial sending of information using high speed pulsing is employed.

The register acknowledges receipt of information and returns a command to the originating junctor to ground the C lead. The C lead holds the matrix connections and operates the cut-off reed relay that, in turn, grounds the pull lead. This signal is recognized by the marker, and the supervisory control removes the pull potentials. Rather than clearing out immediately, the marker waits a few milliseconds to see whether the connection is actually good, which means being held via the "C" lead. If all checks out, the marker enters a "clear out" interval where all functioning circuits are permitted to restore to normal before attempting to process other awaiting calls.

A terminating junctor scanner detects terminating calls awaiting service. This scan is the first to be made after a marker cycle has been completed in order to give preference to terminating calls. With identification of one of the 120 terminating junctors requesting service, the transceiver of the marker is switched to the junctor to receive from the sender the called line number identity and ringing frequency.

The address of the called line is gated into that portion of the identifier which has access to the "pull" leads. If the called line is busy, its cut-off reed relay has been operated and the identifier will find the busy ground on the pull lead. If the line is idle, the identifier is positioned at the called line pull lead and ready to apply the pull potential subject to the command of the supervisory control.

This function operates in principle the same as that described for processing originating traffic. Knowing the called line identity and the terminating junctor identity, the marker can analyze all possible routes through the A, B, D, and E matrices between these two end points and select one route that is idle. Application of pull potential awaiting cut-off operation and verification of holding follows as before.

ARRANGEMENT OF LINE GROUP MATRICES

FIGS. 6–9 when arranged as shown in FIG. 18, show the arrangement and interconnection of the switching matrices and junctors in a line group.

The subscriber lines are connected on the horizontal inputs of the A matrices, such that ten lines are connected at each A matrix. Therefore ten A matrices are provided for a group of 100 lines. Also for each hundreds group, six B matrices are provided, each B matrix having one input connected to each A matrix. Common to the ten hundreds groups or one thousand lines of a line group, there are thirty C matrices, and thirty corresponding D matrices. The connections are such that each C matrix and its corresponding D matrix has its ten inputs connected to the ten different hundreds groups, in such way that in each hundreds group they go to the same input of the same D matrix. Thus since there are six B matrices per hundreds group, the matrices C7 and D7 are connected to the same B matrices as matrices C1 and D1. The verticals of the C matrices are connected to respective originating junctors, with originating junctors OJ1-OJ20 connected to the respective first verticals of the C matrices, originating junctors OJ31-OJ60 connected to the second verticals of the respective C matrices, originating junctors OJ61-OJ90 connected to the third verticals of the respective C matrices, and originating junctors OJ91-OJ120 connected respectively to the fourth verticals of the C matrices.

The originating junctors each have one output connection to the IDF for connection to the inlets of the group selectors, and another connection to the R matrices. Originating junctors 1-20 are connected to the respective horizontals of matrix R1, originating junctors OJ21-OJ40 are connected to the horizontals of the matrix R2, continuing up to matrix R6 which has its horizontals connected to originating junctors OJ101-OJ120. There are four vertical links from each R matrix, or a total of twenty-four, which are connected to the IDF for connection to the register junctors in the register sender group 600. The register junctors in each register sender group are connected to the R matrix verticals of several different line groups.

The E matrices each have twenty horizontal links connected respectively to twenty different D matrices, with matrix E1 connected to first verticals of matrices D1-D20, matrix E2 having its first ten horizontals connected to first verticals of matrices D21-D30 and its second ten horizontals connected to second verticals of matrices D1-D10. Matrix E3 has its twenty horizontals connected to second verticals of matrices D11-D30. Matrices E4 and E8 are similarly connected to other links of the D matrices. The verticals of the E matrices, fifteen from each matrix, are connected to the terminating junctors.

All of the matrices are designated by reference characters in which an initial letter designates the switching stage. In the A and B stages the letter is followed by two numbers. The first number indicating the hundreds group and the second letter indicating the matrix within the hundred groups. Thus in hundreds group one there are ten A matrices A11-A10 and six B matrices B11-B16. These A and B stages are interconnected by links designated by the letters AB followed by three numbers, in which the first number indicates the hundreds group; the second number indicates the A matrix in the hundreds group and the third number indicates the B matrix in the hundreds group to which the link is connected. Thus link AB111 of the first hundreds group connects card A11 to card B11. The lines from the line circuits to the inputs of the A stage are designated by the letter L followed by three digits, with the first number indicating the hundreds group, the second number indicating the A matrix within the hundreds group and the third number indicating the input of the A matrix. Thus lines L111-L110 are connected to the ten inputs of matrix card A11. In the C stage the matrix cards are designated C1-C30, and in the D stage the corresponding D matrices are designated D1-D30. The links interconnecting the B stages to the C and D stages are designated by the letters BC followed by three numbers. The first number indicates the hundreds group of the B matrix and the last two numbers indicate the C and D matrix, with a zero inserted as the center number for connections to cards C1-C9 and D1-D9.

The links interconnecting the D and E stages are designated by the letters DE followed by three numbers. The first number indicating the D matrix with a zero preceding the matrix number for the matrices D1-D9, and the last number indicating the D matrix.

Figure 10:
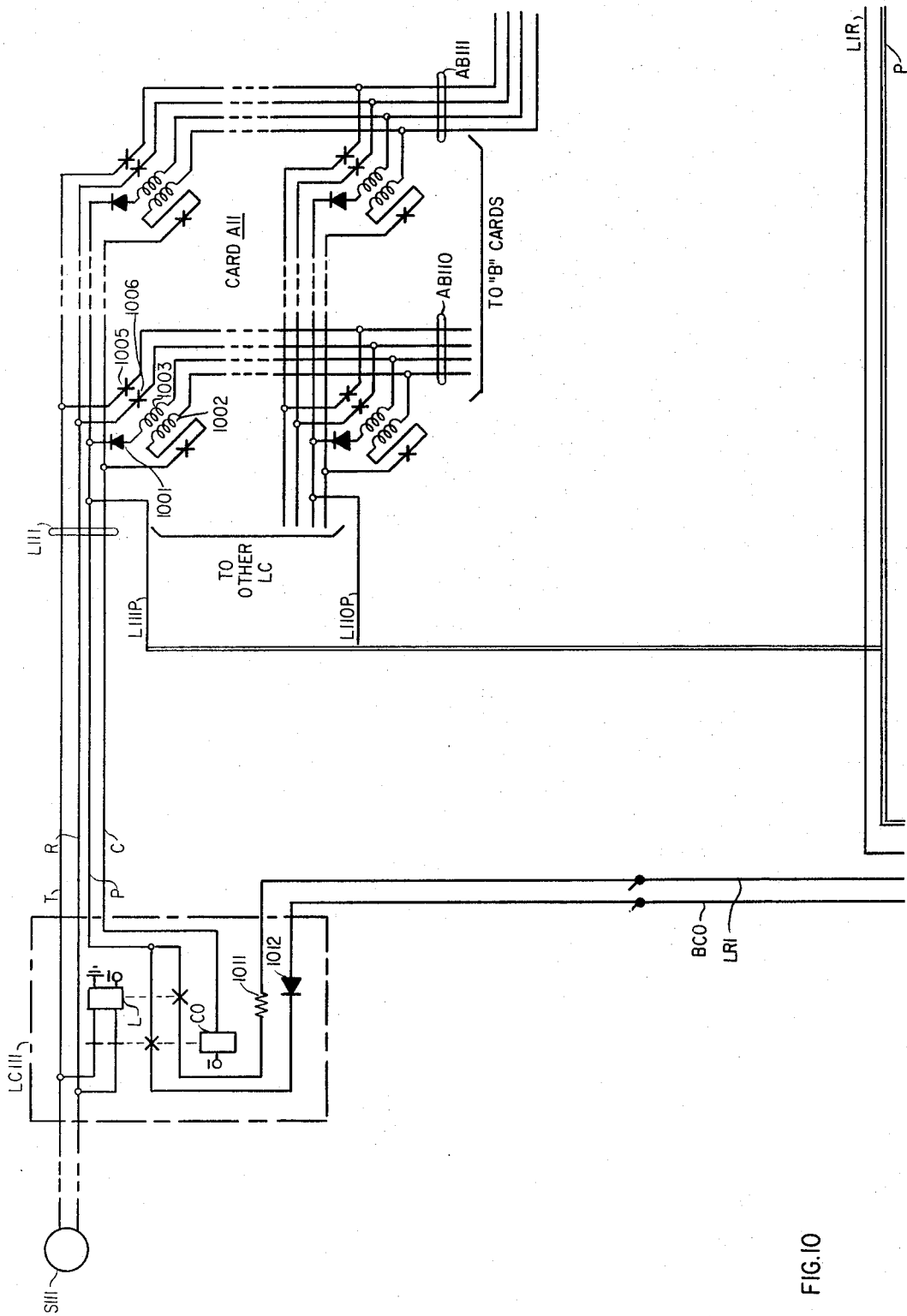
FIGS. 10–15 are to be arranged.
Figure 11:
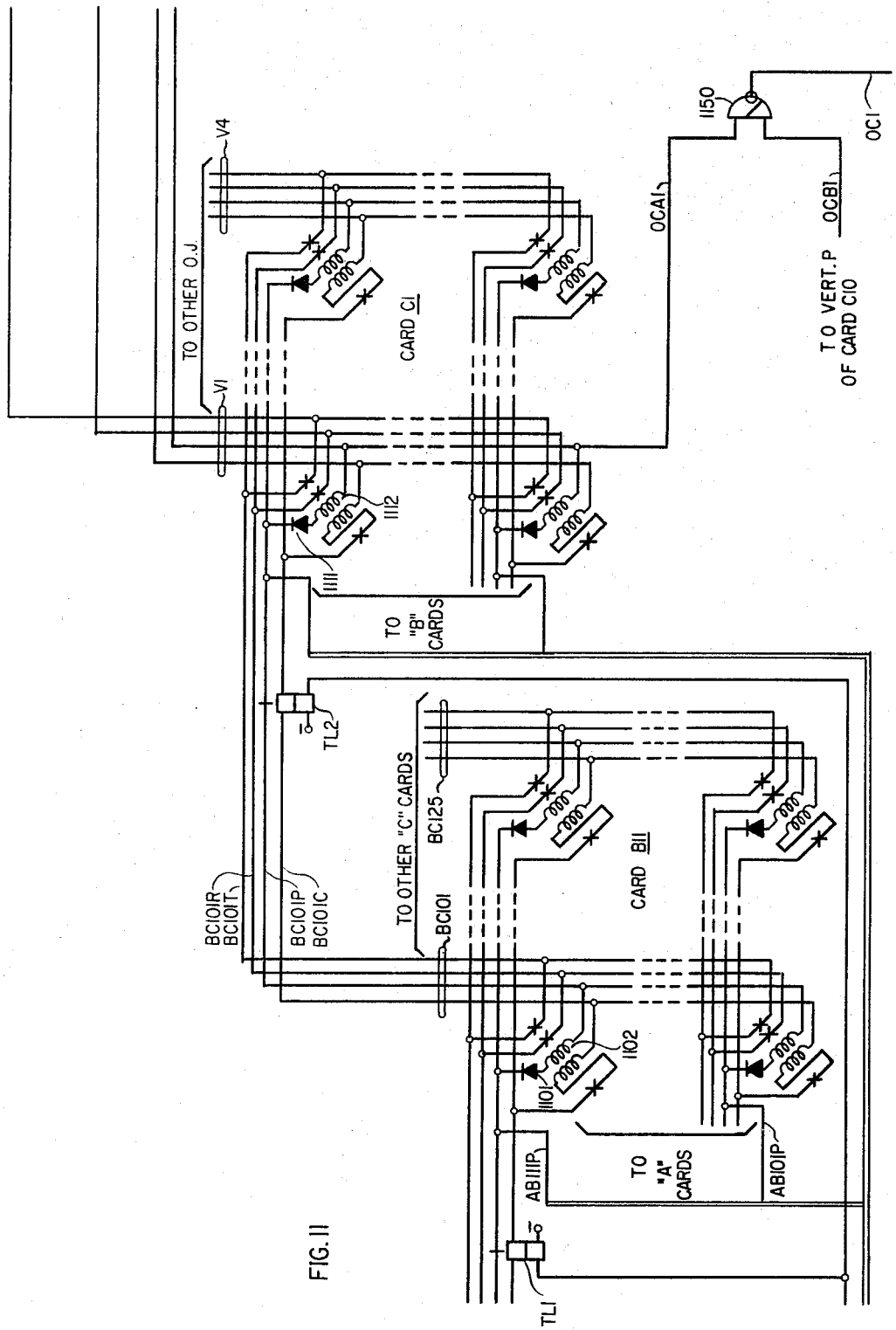
Figure 12:
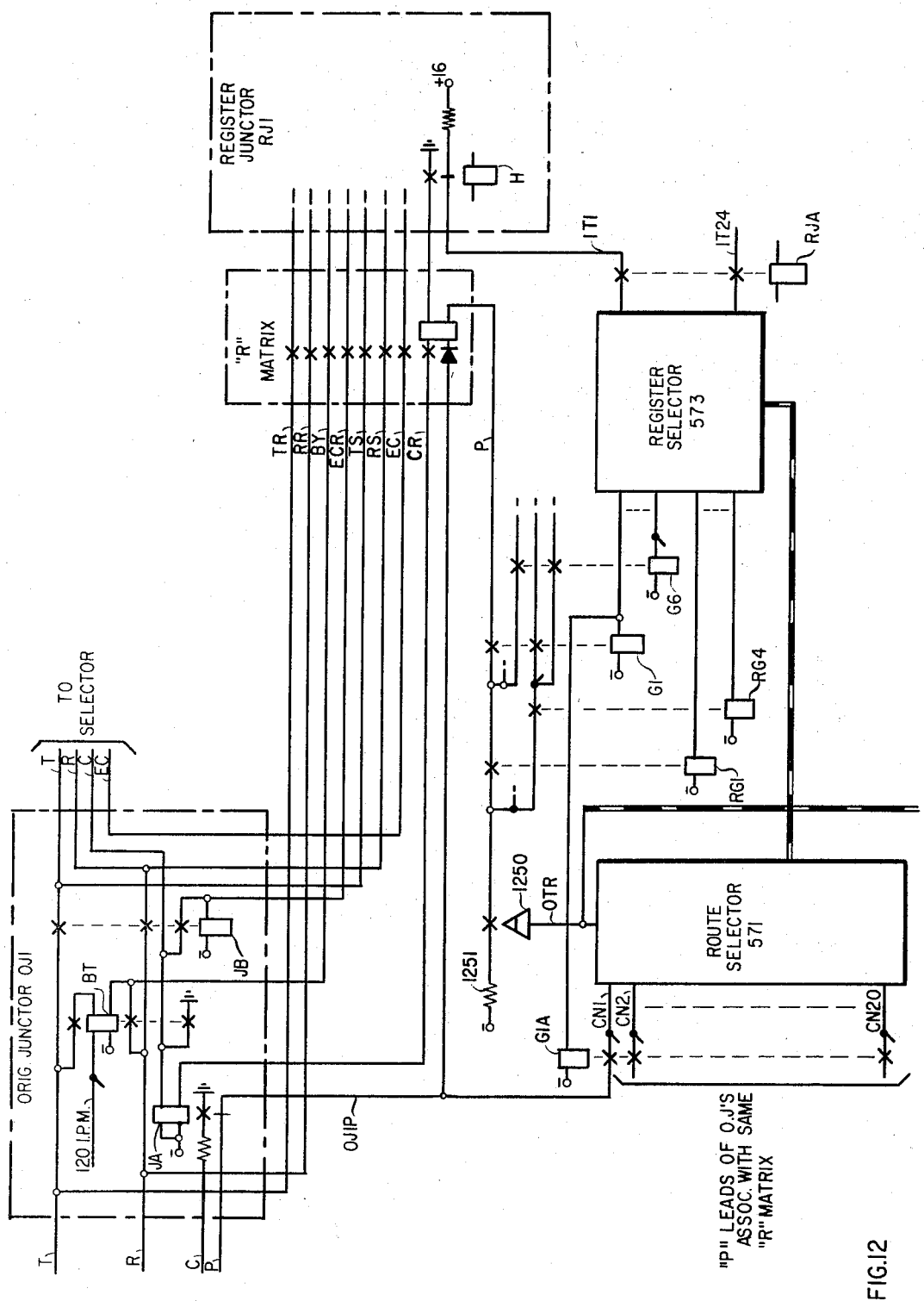

The schematic diagrams of FIGS. 10-12 show part of a matrix card for the A, B and C stages and also a line circuit and an originating junctor. Each matrix comprises a plurality of horizontal links and a plurality of vertical links interconnected by crosspoint switches. Each link comprises four conductors, tip T, ring R, control C, and pull P. The tip and ring conductors provide an extension of the subscribers loop for a talking path, the pull conductor is used to operate the crosspoints, and the control conductor is used to hold the crosspoints in a selected path. Between each horizontal link and each vertical link of a matrix card there is a crosspoint switch comprising three make contacts in three capsules, two windings, and a diode. For example in matrix card A11 the crosspoint switch between horizontal link L111 and vertical link AB111 comprises the contact 1005 and 1006 in the tip and ring conductors respectively, contacts 1007 in series with hold winding 1003 in the control conductor, and the pull winding 1002 in series with a diode 1001 in the pull conductor. To establish an originating path after the marker has selected the route, an operate circuit is established on the pull conductor through the three stages in series, through one cross-point switch in each stage, to operate the crosspoints, then a hold path is established on the C conductor through the three crosspoints to hold the connection. For example if a path is to be established from line circuit LC111 to originating junctor OJ1 negative potential is applied to the lead L111P and ground is applied from the route selector marker to conductor OJ1AP of the originating junctor. This causes current to flow in the path through diode 1001 and winding 1002 of matrix A11, to diode 1101 and the winding 1102 of matrix B11 and through diode 1111 and winding 1112 of matrix C1, causing the three crosspoint switches to operate in series. The diodes block current flow through undesired paths through other pull windings of each card. To hold the path ground is applied from the originating junctor to the C conductor of the vertical link V1 which extends through the hold windings and their series contacts of the three crosspoint switches and cut-off relay CO of line circuit LC111 to negative battery potential.

The line circuit LC111 comprises a line relay L having two windings and a single make contact, and a cut-off relay CO having a winding, two break contacts and a make contact. The tip and ring conductors of line L111, which are connected to the subscriber's loop, are also connected to the break contacts of the cut-off relay CO through the windings of the line relay L to ground and negative battery respectively. The hold is connected through the winding of the cut-off relay CO to negative battery. The pull conductor is connected through the make contact of relay L and a resistor 1011 to conductor LR1 to the marker; and also through the make contacts of the cut-off relay CO and a diode 1012 to conductor BCO to the marker. The conductors LR1 and BCO are multipled to all of the one thousand line circuits of the group.

The originating junctor (FIG. 12) provides connections from the originating path from the C matrices through the junctor and the R matrix to a register junctor, and a line to the IDF for access to an inlet circuit of the group selector. The transmission path (conductors T and R) from the C matrix to the group selector is split in the originating junctor. The incoming path is connected to the register by leads TR and RR; and the outgoing path by conductors TS and RS to the sender. The contacts of relay JB provide the split. Switching through of the connection is accomplished by operating relay JB under control of the register via lead ECR, which in turn causes the operation of relay 15JA.

Holding of the preceding switch train by ground on the hold lead is under control of the register junctor via lead CR to relay JA before cut through; and under control of the group selector via the hold lead to relay JA after cut through. The R matrix is released after cut through.

If a link busy condition is encountered, relay BT is operated by the register junctor via lead BY to return link busy tone (120 IPM). Relay BT remains operated under control of the calling line. No cut through occurs under this condition.

LINE IDENTIFIER

Figure 13:
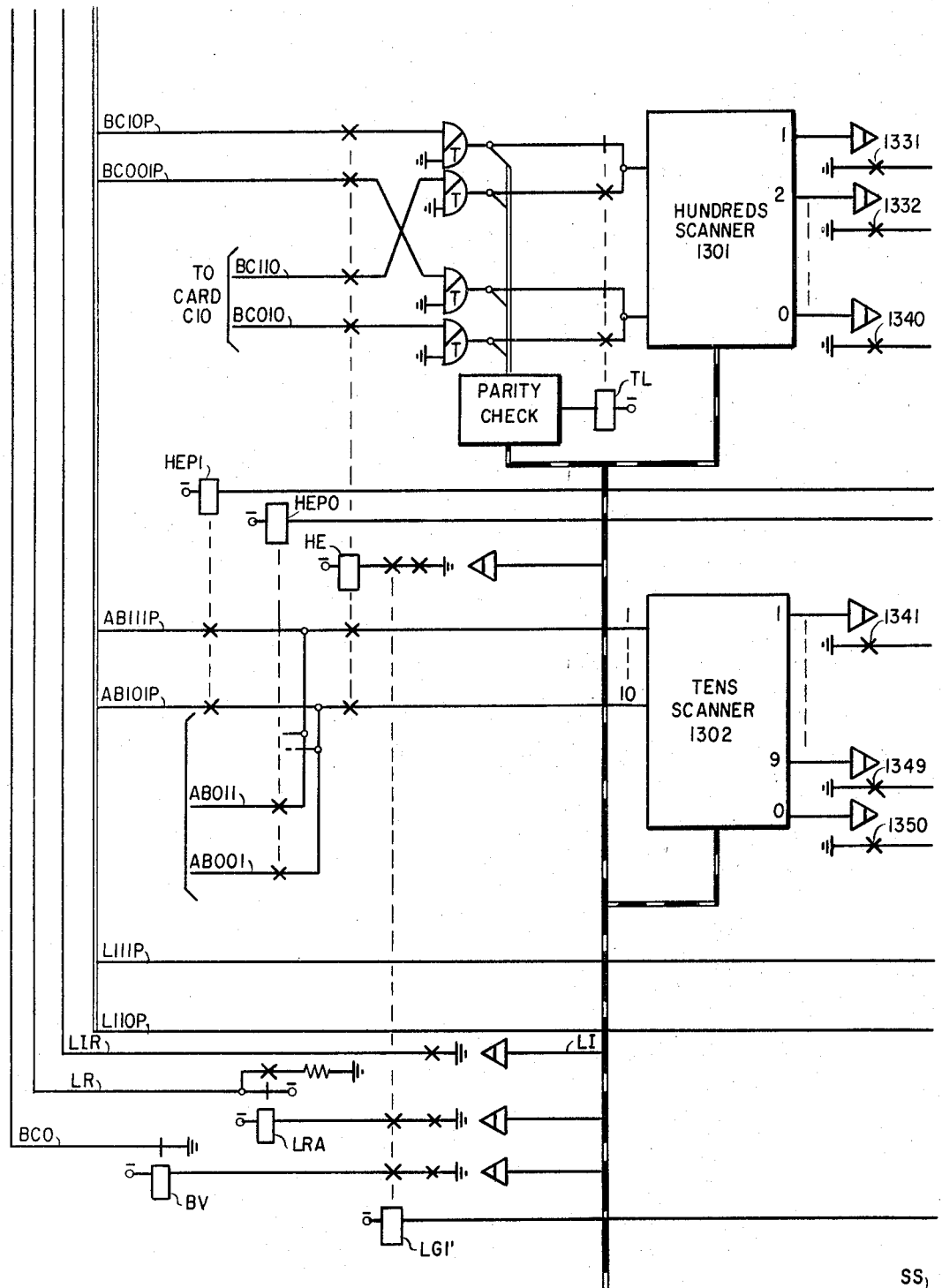
Figure 14:
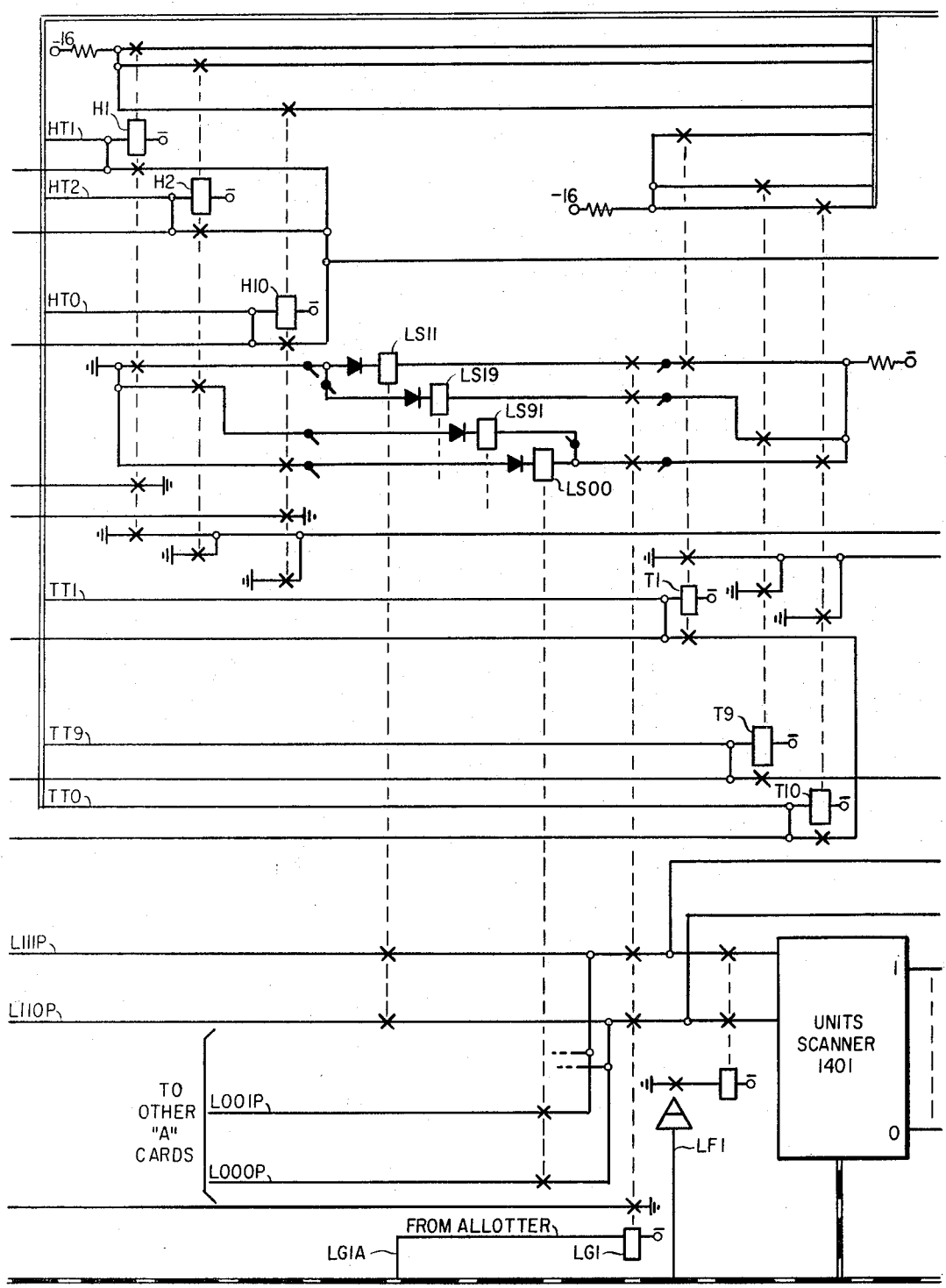
Figure 15:
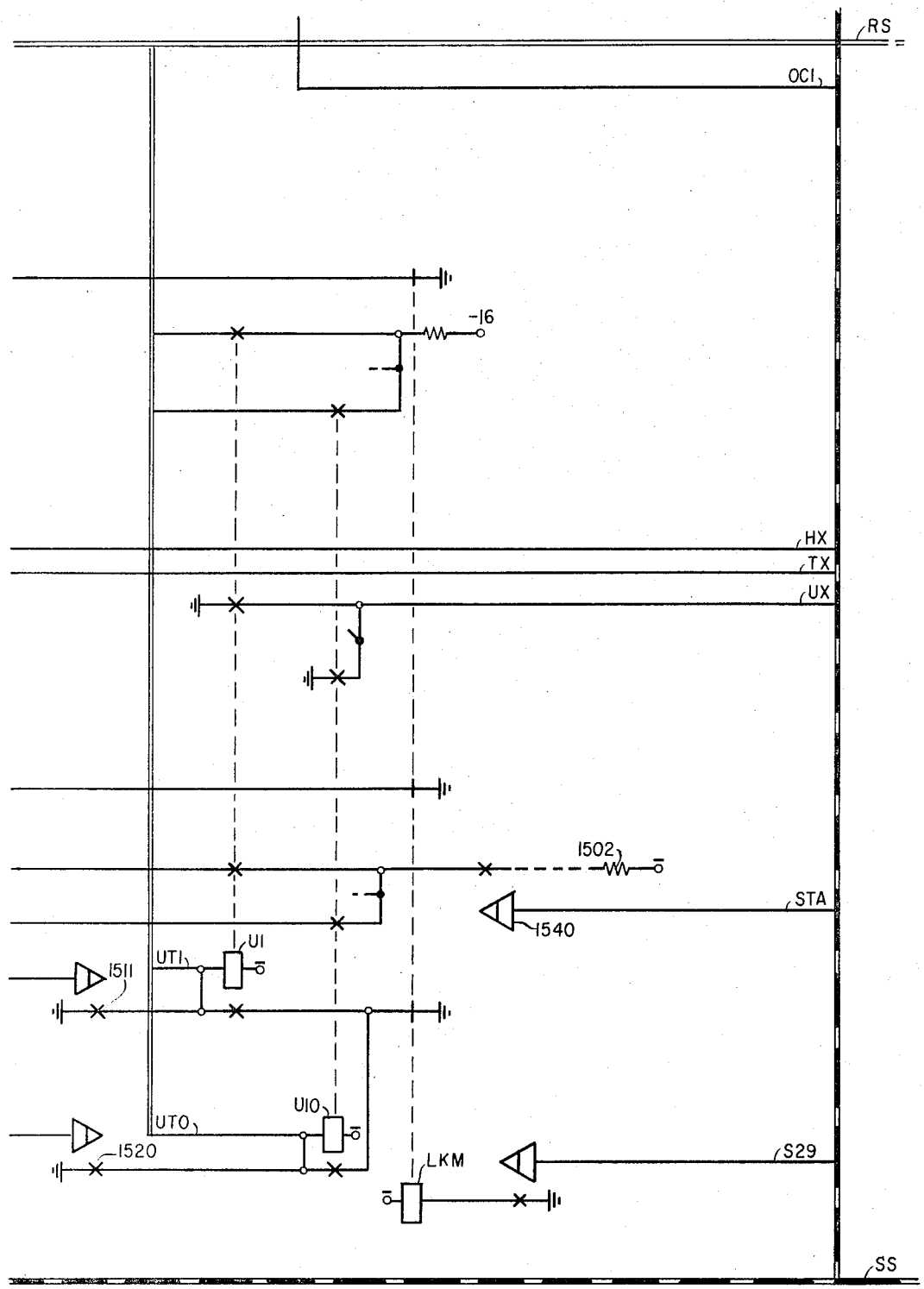

FIGS. 13, 14 and 15 show the line identifier 562 of the line group marker 320, and associated portions of the line group connect unit 448. These FIGS. 13–15 along with FIGS. 10–12 should be arranged as shown in FIG. 19. For convenience the components associated with the line identifier 562 and the line group connect unit 448 have been shown together, and the allotter and the transfer contacts of unit 552 which connect these circuits have been omitted. Also for convenience in the drawing relays are shown having a large number of contacts although in the physical embodiment of this system the reed relay assemblies have been limited to ten contacts, and additional contacts are obtained by using parallel and slave connected reed relays.

The principal units of the line identifier are a hundreds scanner 1301, a tens scanner 1302, and a units scanner 1401. These units may be scanners or parallel test and lockout circuits which perform the following functions: (1) a signal at any one of the inputs causes a device corresponding with this input to be set, (2) with one of these devices in set condition signals at other inputs are inhibited from setting their corresponding device, and (3) the device in said position operates a corresponding relay. Many circuits exist which meet these requirements. In the chosen embodiment scanners operated under the control of pulse sources and sequence state circuits in the sequence and supervisory unit 290 have been used. The output devices comprise relay drivers 1331–1340 from hundreds scanner 1301, relay drivers 1341–1350 from tens scanner 1302, and relay drivers 1511–1520 from units scanner 1401. A relay driver device, shown symbolically by a triangle with a line across it and an associated make contact, comprises a single transistor amplifier with a winding in its collector circuit and the single contact which is a reed capsule operated by the winding. The relays which are operated under the control of the relay drivers are relays H1–H10 associated with the hundreds scanner 1301, relays T1–T10 associated with the tens scanner 1302, and relays U1–U10 associated with the units scanner 1401. These relays along with the scanners, relay drivers, and circuits immediately associated therewith comprise the line identifier 562 and are normally common to five line groups of 1000 lines each. The connect relays of unit 448 which are individual to one line group of 1000 lines include relays HE, and ten relays HEP1 to HEP0 shown in FIG. 13; and 100 relays LS11 to LS00 shown in FIG. 14. The principal connect relay of unit 148 is relay LG1 shown in FIG. 14, which is shown as having a slave relay LG1' in FIG. 13.

Referring again to FIGS. 10 and 11, looking at the P leads of the horizontal inputs of a single one of the cards such as card C1, a negative potential applied to the P lead in any one of the line circuits can be detected through the diodes and pull windings of the A and B matrix cards, since the diodes are forward biased. Thus a negative potential applied to the P lead at any line circuit of hundreds group 1 such as to conductor L111P, can be detected at the first horizontal input of card C1, on conductor BC101P. Likewise a call in any of the other hundreds group of the 1000 line group will appear at a corresponding one of the P leads of the horizontal inputs of card C1. These leads are taken through cable P to FIG. 13, and thence through contacts 1 to 10 respectively of relay HE and amplifiers 1311 to 1320 respectively, and make contacts of relay TL to the ten inputs of hundreds scanner 1301. Likewise in each hundreds group the P leads of the horizontal inputs of any one of the cards can detect a potential at any one of the ten lines of the A matrix card connected to that input. Thus in hundreds group 1 a call at any one of the lines L111 to L110 at the inputs of card A11 will appear at the conductor AB111P at the input of card B11. The ten leads AB111P to AB101P from card B11 are taken through cable P to FIG. 13, and through respective make contacts of relays HEP1 and relay HE to the ten inputs of the tens scanner 1302. Likewise from each of the other hundreds groups the ten P leads from the horizontal inputs of one of the B cards, namely card B21 of hundreds group 2, card B31 of hundreds group 3 and so on to card B01 of hundreds group 10, are taken in FIG. 13 through contacts of corresponding one of the relays HEP2 (not shown) to HEP0. At the horizontal input terminals of the A cards, all of the 1000 P leads, ten from each card of the 100 A matrix cards, for example leads L111P to L110P of card A11, taken via cable P to FIG. 13, thence to FIG. 14, pass through contacts of a corresponding one of the relays LS11 to LS00, and then common together and are taken through contacts 11–20 of relay LG1 and contacts 1–10 of relay UP to the units scanner 1401. The inputs to each of the scanners are multipled to the other line groups as shown by the multiple symbols which in the case of the hundreds and tens scanners are just to the right of the contacts of relay HE, and in the case of the units scanner just to the right of the contacts of relay LG.

The ten P leads from the horizontal P leads of card C10 namely conductors BC110P to BC010P (FIG. 13) are also taken through another set of ten contacts 11 to 20 of the relay HE and amplifiers 1321 to 1330 through make contacts of relay TL to the hundreds scanner 1301. These leads are also from the first B card of each hundreds group but from the second vertical. Thus in case of failure of diodes in the B card this second group of P leads may be switched in. This is provided by taking the outputs of the amplifiers 1311 to 1329 and 1321 to 1330 to a parity check circuit 1303. This circuit is arranged to detect failures and in response thereto to operate the relay TL to open its break contacts and close its make contacts so that the inputs BC110P to BC010P are switched into the hundreds scanner instead of the inputs from card C1.

ROUTE SELECTOR

The line identifier arrangement using the pull conductor path through the switching network as described in the preceding section is covered by the U.S. patent application of L. Bruglemans, Line Identifier Arrangement for a Communication Switching System, Serial No. 231,425, filed October 18, 1962, now patent No. 3,211,837. The route selector according to the invention also makes use of the pull conductor path through the switching network for testing. Both of these arrangements take advantages of the fact that the switching network provides a unique path through the plurality of stages in tandem, which as shown in FIGS. 10 and 11 are the A, B and C stages of the line group switching network. The two arrangements may be used in combination, even though the route selector arrangement requires busy relays in all of the interstage links to open the pull conductors of busy links, while the line identifier arrangement requires that in certain of the links the path from the line circuits through the three stages remain intact. This is accomplished by providing the busy relays of those interstage links required for line identification with a second differentially wound winding. Line identification and route selection never occur at the same time in the marker operation sequence. During the line identification sequence a signal L1 from the sequence circuits operate a relay driver to apply ground via lead L1R to the differential windings of all of these busy relays such as TL1 and TL2 in FIG. 11. These busy relays then restore closing the contacts in the pull leads so that line identification can be accomplished.

The route selector 571 shown in FIG. 12 as a box is the same as that shown in FIGS. 1 and 2, except that 20 routes via leads CN1–CN20 need to be tested, and therefore one of the counters should be a four-step counter and the other should be a five-step counter.

Figure 9:
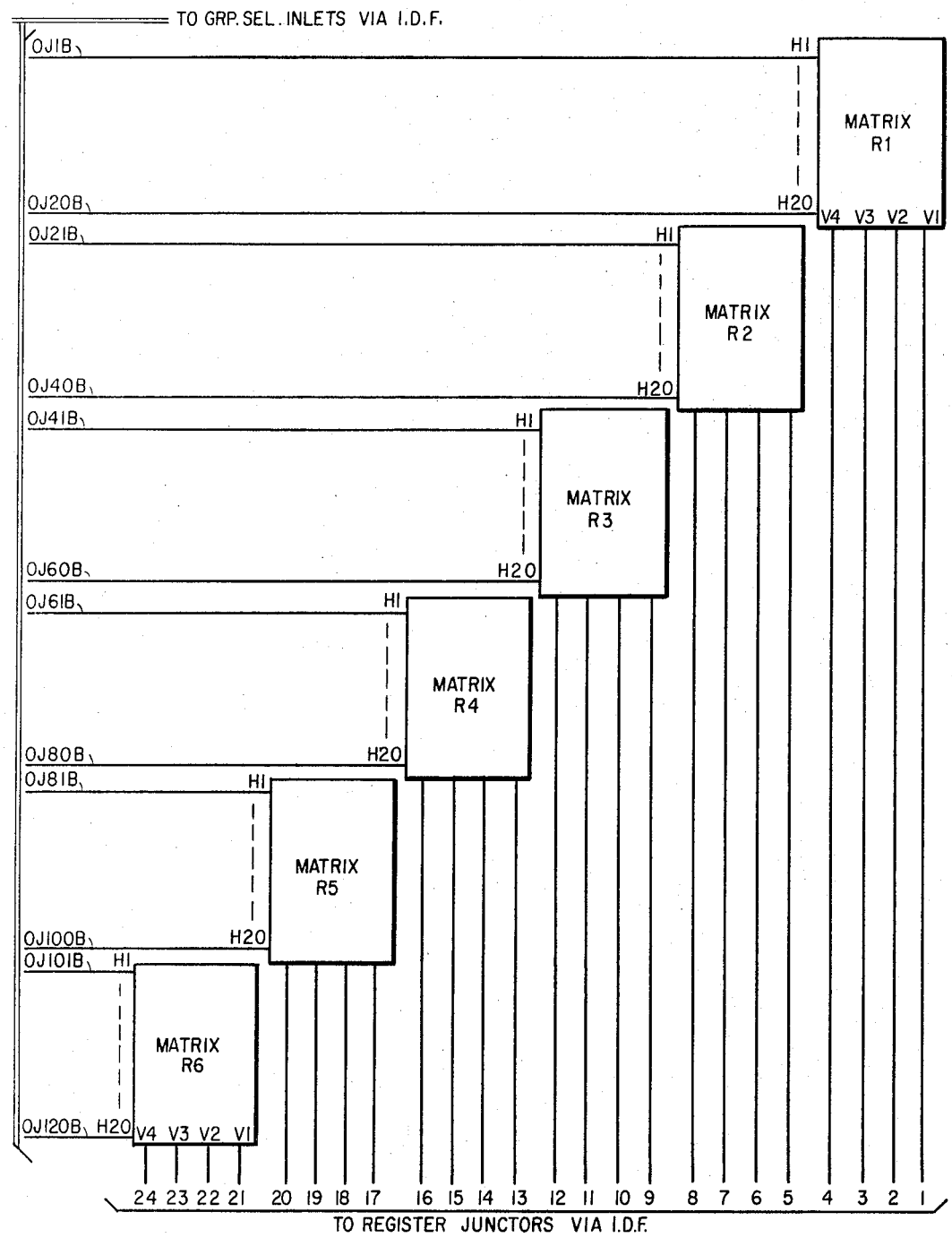

The register selector 573 is also shown as a block in FIG. 12. The inputs to the register selector are the 24 idle test leads IT1–IT24 from the register junctors which are connected to the R matrices of this line group. As shown in FIG. 9 there are six R matrices, each having four register junctors connected thereto. Therefore the register selector 573 is arranged to select one of the R matrices and one of the registers connected to that matrix, and has its output correspondingly operate one of the six relays G1–G6 and one of the four relays RG1–RG4. These relays have contacts in a tree arrangement, which among other things serves to connect a potential from a negative source via a resistor 1251 and contacts of a relay driver 1250 to the pull conductor of the R matrix which extends through the pull winding of the matrix to the pull conductor of the originating junctor. The output of the register selector also is used to connect the path testing inputs CN1–CN20 of the route selector to the pull leads of the originating junctors for testing and operation; for example the relay G1A (FIG. 12) is shown operating in parallel with relay G1 to connect the leads CN1–CN20 to the pull leads of the twenty originating junctors connected to R matrix 1 (see FIG. 9). The path testing leads CN1–CN20 of the route selector are also connected in multiple to contacts of other relays for connection to the pull leads of originating junctors associated with other R matrices, and also for terminating calls to the DE links associated with the E matrices.

OPERATION

Assume now that the subscriber at station S111 initiates a call. In response to the closing of the subscriber loop, the line relay L of line circuit LC111 operates and closes its contacts. Negative battery potential through the break contacts of relay LR (FIG. 13) is applied over conductor LR1 and resistor 1011 of line circuit LC111 and the contacts of relay L to the pull conductor L111P, thence through diode 1001 and winding 1002 on card A11, diode 1101 and pull winding 1102 on card B11, to conductor BC101P at the input of card C1, thence through cable P to FIG. 13. The potential is also applied through diode 1111 and winding 1112 of card C1 to the P lead of vertical V1, thence by way of conductor OCA1 and gate 1150 to an input of the allotter 552. Note that the potential on the pull lead L111P is also applied through another path on P conductors through the A, B and C stages to a vertical P conductor of card C10 and thence by way of conductor OCB1 to another input of the gate 1150. Also at the horizontal input of card C10, the potential appears on conductor BC110P shown in FIG. 13. This use of alternate signals by way of card C10 provides an extra margin of safety in case of failures of diodes in the switching network.

The allotter supplies a signal to the sequence and supervisory circuit 590 (FIG. 2), which causes the marker to enter an originating call sequence state. Also from the allotter ground is applied to conductor LG1A to operate the relay LG1, which connects line group 1 to the marker. Contacts 21 of relay LG1 supplies ground potential to operate the slave relay LG1', which at its contacts 1 operates relay HE. Relay HE at its contacts 1 to 10 connects through the conductors BC101P to BC001P through the amplifiers 1311 and 1320 and the break contacts of relay TL to the hundreds scanner 1301, and also at its contacts 11 to 20 connects through the alternate conductors BC110P to BC010P, and at its contacts 21 to 30 prepares operate circuits for the relays HEP1 to HEP0.

In response to a signal from the sequence and supervisory circuits via cable SS, a 10-step counter in the hundreds scanner 1301 starts and steps until it finds coincidence of its output with a signal at one of the inputs to the scanner, which in this case is step 1, since the call is from hundreds group 1. The relay driver 1331 operates and supplies ground potential to operate the relay H1. Relay H1 through its contacts 2 locks to ground potential at break contacts 1 of relay LKM. Ground potential through contacts 4 of relay H1 completes the operating path for relay HEP1. The conductors AB111P to AB101P from card B11 through cable P are connected through contacts 1 to 10 of relay HEP1 and contacts 31 to 40 of relay HE to the inputs of the tens scanner 1302. A signal at contacts 5 of relay H1 is transmitted by way of conductor HX and cable SS to the sequence and supervisory circuits, which causes the tens scanner to start counting. Since the call is in tens group 1 the tens scanner finds coincidence at step 1 and operates the relay driver 1341, which in turn supplies ground potential to operate the relay T1. Relay T1 through its break contacts 4 locks to ground potential at break contacts 2 of relay LKM.

Negative battery potential is supplied through resistor 1402 and contacts 2 of relay T1 in multiple to the five line groups and through contacts 1 of relay LG1 to ten of the 100 LS relays in line group 1 namely relays LS11, LS21, to LS91, and LS01. Ground potential is supplied through contacts 3 of relay H1 in multiple to the five line groups, and through locking diodes to ten of the 100 LS relays of the line group, namely relays LS11, LS12, to LS19 and LS10. Therefore relay LS11 in line group 1 operates.

The ten leads L111P to L110P from the horizontal inputs of card A11 through cable P are connected through contacts 1 to 10 of relay LS11, contacts 11 to 20 of relay LG1, and contacts 1 to 10 of relay UP to the inputs of units scanner 1401. At contacts 3 of relay T1 a signal is sent by conductor TX and cable SS to the sequence and supervisory circuits to cause the counter in units scanner 1401 to start stepping. The counter finds coincidence at step 1 and operates the relay driver 1511 which in turn operates the relay U1. Relay U1 at its contacts 4 and break contacts 3 of relay LKM locks to ground.

With the relays H1, T1, and U1 operated the line L111 is identified. The identity of the calling line is supplied through cable SR to the send receive circuit 580, from negative battery through resistor 1493 and contacts 1 of relay H1, from negative battery through resistor 1404 and contacts 1 of relay T1, and from negative battery through resistor 1501 and contacts 1 of relay U1.

In the meantime a register is preselected during a sequence between the tens selection and units selection sequences. Assume for example that the register selector 573 has preselected the register junctor RJ1, and that therefore the relays G1 and RG1 are operated, and also in FIG. 15 relay G1A is operated to connect the leads CN1–CN20 to the twenty originating junctors associated with matrix R1.

With the line identification and register preselection completed, the marker then enters a sequence in which the route selector 571 as actuated. The signal STA from the sequence circuits causes the flip-flop ST (FIG. 2) to be operated to start the route selector, and in FIG. 15 operates a relay driver 1540 to connect negative potential through a resistor 1502 through contacts of the relay tree actuated by the line identifier to pull conductor L111P thence via the pull conductor path through the A, B and C matrices and the originating junctor to conductor OJ1P and thence via the contacts of relay G1A to conductor CN1. The route selector in scanning finds the negative potential on lead CN1 to select the corresponding path through the network and applies a ground potential via low resistance thereto. This causes the crosspoint relay windings 1002 in the A matrix, 1102 in the B matrix, and 1112 in the C matrix to operate the corresponding crosspoint. Also the crosspoint shown in FIG. 12 in the R matrix is operated via the negative potential through resistor 1251 contacts of relay driver 1250 actuated by the signal OTR from the route selector to thereby operate the R matrix crosspoint. The register junctor operates its hold relay H to apply ground potential to the hold conductor which extends through the R matrix to conductor CR to operate relay JA in the originating junctor. Relay JA applies ground potential to the hold conductor to the C matrix which extends in series through the three stages and through the cut-off relay CO of the line circuit and negative battery potential to thereby hold the connection. The marker then tests the line circuit to determine whether the cut-off relay has actually operated, to thereby verify that the connection has actually been completed. The marker then releases.

Note that in the established connection the relays TL1 and TL2 operate in series in the hold conductor to open their contacts in the P conductors to mark the respective links busy, and also that in the originating junctor the relay JA opens contacts in the P lead to mark the junctor busy.

TERMINATING CALL

On a terminating call one of the terminating junctors 430 is seized by the group selector, which causes it to supply a call to the marker. The terminating junctor selector 574 selects first the E matrix on which the call appears and then a particular terminating junctor in a manner similar to the operation of the line identifier arrangement. The send receive circuit 580 receives the line identity via the terminating junctor. Referring to FIGS. 13 and 14, this identity is supplied via cable SR to one of the conductors HT1–HT0 to operate the corresponding one of relays H1 to H10; to one of the conductors TT1 to TT0 to operate the corresponding one of relays T1 to T10; and to one of the conductors UT1 to UT0 to operate the corresponding one of relays U1 to U10. This causes a path to be established from negative potential through resistor 1502 and the line identifier relay tree to the pull conductor of the selected line circuit.

The terminating junctor selector has in the meantime operated a relay (not shown) to connect the twenty leads CN1–CN20 to the pull conductors of the DE links which are connected to the selected E matrix. Route selection takes place in the same manner as for an originating call and the connection is established and held in a similar manner.

While there has been described above the principles of the invention in connection with specific apparatus, it is to be clearly understood that this description is made only by way of example and not as a limitation to the scope of the invention.

What is claimed is:

1. In a communication switching system, a first set of terminals, a second set of terminals, a plurality of switching stages arranged in tandem for selectively electrically connecting terminals of the first set with terminals of the second set, each of said stages comprising a plurality of relays arranged in coordinate arrays, a unidirectional device individual to each of said relays and connected in series with the winding thereof, at the coordinate points of each of said arrays, links interconnecting adjacent stages;

means to apply a first marking potential to a selected terminal of the first set, scanning means including detecting devices coupled to the terminals of the second set to scan said second set to detect said first marking potential and stop the scanning means at the corresponding terminal of the second set;

timing means connected to the scanning means to start responsive to said detection of the first marking potential to measure a predetermined time interval, counting means in said timing means, said counting means remaining stopped during this interval only so long as said marking potential continues to be detected and being started upon the absence of the marking potential to continue the scan of other detecting devices for the marking potential;

and means responsive to the continuation of the marking potential for the duration of said interval at one counting position to cause the timing arrangement to generate a signal which locks the counting means in its position and also causes a second marking potential to be applied to the selected terminal of the second set corresponding to the counting means position to produce a potential difference between the first and second marking potentials through the switching stages in the forward direction of said unidirectional devices between the two selected terminals through a series path including the winding of one coordinate point relay of each of said stages, which causes said relays in the path between the two selected terminals to operate and thereby establish a communication path;

whereby noise pulses having a duration less than said given interval induced in the operate path of the switching stages are not effective to cause the scanning means to select and establish a connection.

2. In a communication switching system, the combination as claimed in claim 1, wherein each of said coordinate point relays includes a second winding connected in series with a normally open set of its own contacts, and wherein each of said interstage links includes a busy relay having a winding in a hold conductor of the link and a normally closed contact set in series in said path through the first said winding of each coordinate point relay, and means for completing a holding circuit in series through the second windings and said coordinate point relay series contacts and the windings of said busy relays in the established path, means effective subsequent to the establishment of the holding path for removing said marking potentials and thereby opening the operate circuit, the contacts of said busy relays in the links of the establishd path operated to the open condition being effective to prevent selection of these links by said scanning means for use in other connections.

3. In a communication switching system, the combination as claimed in claim 2, wherein each of said stages comprises a plurality of coordinate matrices, and the links between the matrices of adjacent stages are connected to form one and only one path including one coordinate point relay of each stage between any terminal of said first set and any terminal of said second set.

4. In a communication switching system, the combination as claimed in claim 3, further including a busy relay associated with each terminal of the second set which is operated in response to selection of the terminal to operate a normally closed contact set in series between said network and said detecting device of the scanning means to open the path to the scanning means when the terminal of the second set is busy.

5. In a communication switching system, a first set of terminals, a second set of terminals, a plurality of switching stages arranged in tandem for selectively electrically connecting terminals of the first set and terminals of the second set, each of said stages comprising a plurality of relays arranged in coordinate arrays, links interconnecting adjacent stages, each link having an operate conductor, a diode individual to each of said relays and connected in series with an operate winding thereof between the operate conductors of adjacent links at the coordinate point of each of said arrays;

a line identifier means comprising detecting and recording means, means for connecting the detecting and recording means to certain ones of said links to use certain of said diodes connected to said certain links to form a tree arrangement from all of the terminals of said first set;

means responsive to a service request signal at at least one of the terminals of the first set for applying a first-polarity potential at the associated operate conductor of the first switching stage, and means for causing the detecting and recording arrangement to detect this marking potential via said certain diodes and links to record the identity of the marked terminal of the first set;

means to apply a first marking potential to the terminal of the first set selected by said line identifier, scanning means including detecting devices coupled to the terminals of the second set to scan said second set to detect said first marking potential and stop the scanning means at the corresponding terminal of the second set, means for applying a second marking potential to the terminal of the second set at which the scanning means has been stopped to produce a potential difference in the forward direction of said diodes between said selected terminals of the first set and second set through a series path including the operate winding of one coordinate point relay of each of said stages, which causes said relays in the path between the selected terminals to operate and thereby establish a communication path.

6. In a communication switching system, the combination as claimed in claim 5, wherein each of said coordinate point relays also includes a hold winding connected in series with a normally open set of its own contacts, and wherein each of said interstage links includes a busy relay having a winding in series in a hold conductor of the link and a normally closed contact set in series in the operate conductor, and means for completing a holding circuit in series through the hold windings and said coordinate point relay series contacts and the windings of said busy relays in the established path, means effective subsequent to the establishment of the holding path for removing said marking potentials and thereby opening the operate circuit, the contacts of said busy relays in the links of the established path operated to the open condition being effective to prevent selection of these links by said scanning means for use in other connections;

each of the busy relays in said certain links used for line identification having a second differentially wound winding which is actuated during line identification to thereby restore these relays, whereby the tree arrangement used for line identification is intact, the said second windings of the busy relays being unactuated during operation of said scanning means to detect the marking potential at the terminals of the second set, so that paths via busy links will not be selected.

References Cited by the Examiner

UNITED STATES PATENTS

| | | | |
|---|---|---|---|
| 2,962,557 | 11/1960 | Radcliffe et al. | 179—18.7 |
| 3,188,423 | 6/1965 | Glenner et al. | 200—87 |
| 3,194,891 | 7/1965 | Lucas et al. | 179—18.7 |

KATHLEEN H. CLAFFY, *Primary Examiner.*

L. A. WRIGHT, *Assistant Examiner.*